(12) United States Patent
Sun

(10) Patent No.: US 9,746,638 B2
(45) Date of Patent: Aug. 29, 2017

(54) IMAGING LENS AND IMAGING APPARATUS

(71) Applicant: FUJIFILM Corporation, Tokyo (JP)

(72) Inventor: Ping Sun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/154,352

(22) Filed: May 13, 2016

(65) Prior Publication Data

US 2016/0356985 A1 Dec. 8, 2016

(30) Foreign Application Priority Data

Jun. 8, 2015 (JP) ................................ 2015-115489

(51) Int. Cl.

| | |
|---|---|
| *G02B 13/18* | (2006.01) |
| *G02B 9/64* | (2006.01) |
| *G02B 13/16* | (2006.01) |
| *G02B 9/14* | (2006.01) |
| *G02B 5/00* | (2006.01) |
| *G02B 9/08* | (2006.01) |
| *G02B 13/00* | (2006.01) |
| *G02B 9/12* | (2006.01) |
| *G02B 9/00* | (2006.01) |
| *G02B 15/173* | (2006.01) |

(52) U.S. Cl.
CPC .............. *G02B 9/64* (2013.01); *G02B 13/16* (2013.01); *G02B 5/005* (2013.01); *G02B 9/00* (2013.01); *G02B 9/08* (2013.01); *G02B 9/12* (2013.01); *G02B 9/14* (2013.01); *G02B 13/0035* (2013.01); *G02B 13/0045* (2013.01); *G02B 13/18* (2013.01); *G02B 15/173* (2013.01)

(58) Field of Classification Search
CPC ... G02B 13/0035; G02B 13/0045; G02B 13/18; G02B 9/12; G02B 5/005; G02B 15/173; G02B 9/14; G02B 9/00; G02B 9/08; G02B 9/64; G02B 13/16
USPC ................................ 359/716, 740, 748, 785
See application file for complete search history.

(56) References Cited

U.S. PATENT DOCUMENTS

| | | | |
|---|---|---|---|
| 8,238,044 B2* | 8/2012 | Wada | G02B 13/18 359/683 |
| 2014/0340563 A1* | 11/2014 | Yamada | G02B 9/64 348/345 |

FOREIGN PATENT DOCUMENTS

| | | |
|---|---|---|
| JP | 2013-003324 A | 1/2013 |
| JP | 2013-161076 A | 8/2013 |

* cited by examiner

*Primary Examiner* — Evelyn A Lester

(74) *Attorney, Agent, or Firm* — Studebaker & Brackett PC

(57) ABSTRACT

An imaging lens is constituted by, in order from the object side to the image side: a positive first lens group; a stop; a negative second lens group; and a positive third lens group. Only the second lens group moves in the direction of the optical axis to perform focusing operations. The first lens group is constituted by, in order from the object side to the image side, a first lens group front group and a first lens group rear group. The first lens group front group is constituted by, in order from the object side to the image side, one positive lens and one negative lens, the first lens group rear group includes at least two negative lenses and at least three positive lenses. The second lens group is constituted by one or two positive lenses and one negative lens.

20 Claims, 13 Drawing Sheets

FIG.1
EXAMPLE 1
INFINITY
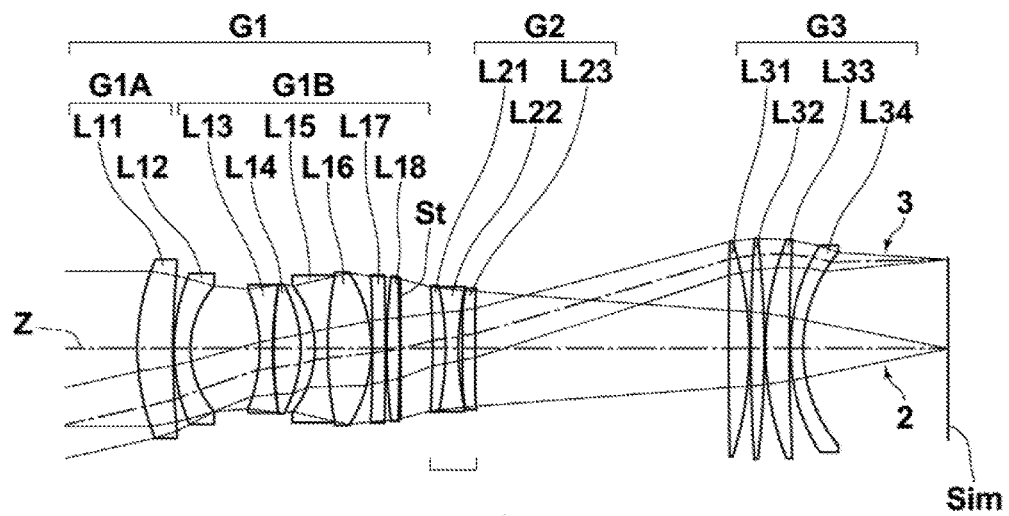
PROXIMAL
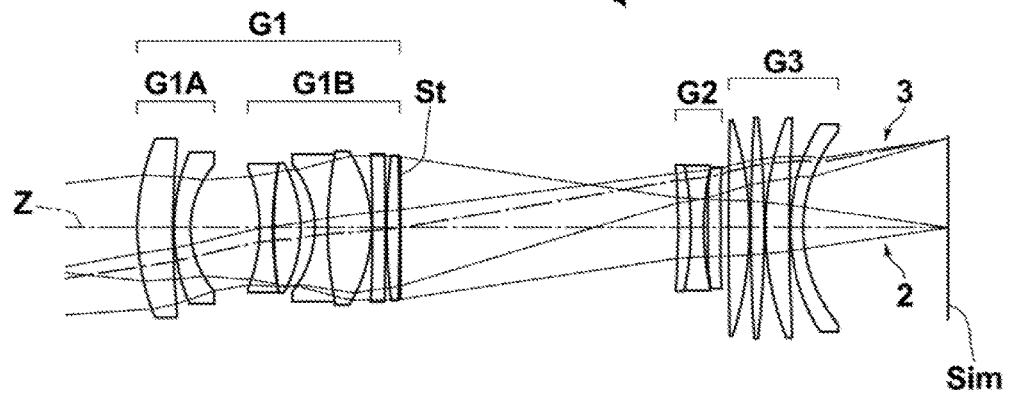

FIG.2
EXAMPLE 2
INFINITY
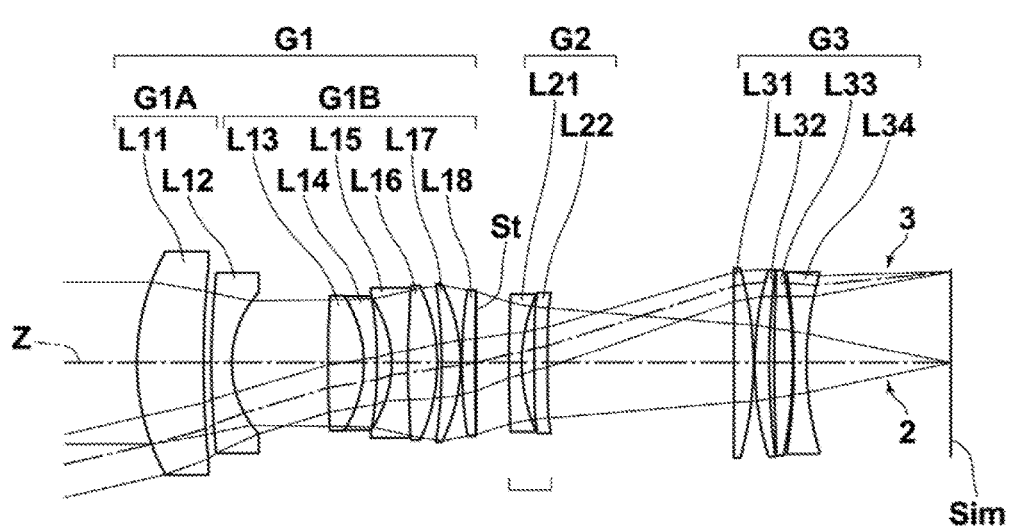
PROXIMAL
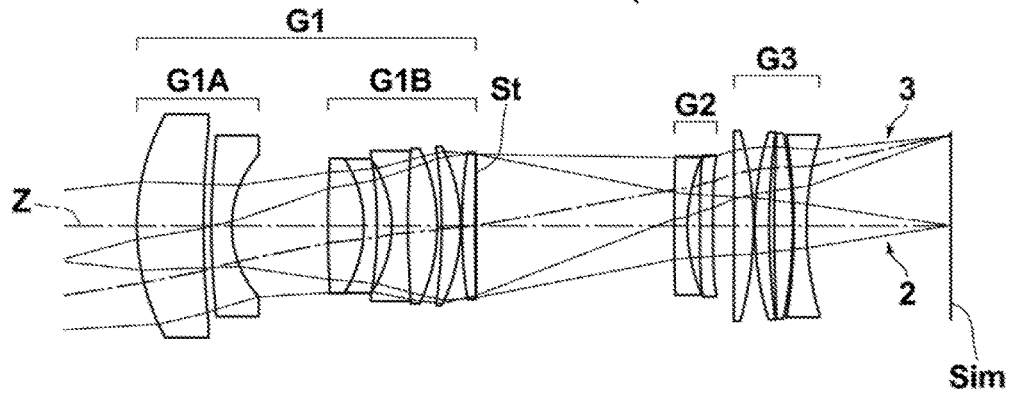

FIG.3
EXAMPLE 3
INFINITY
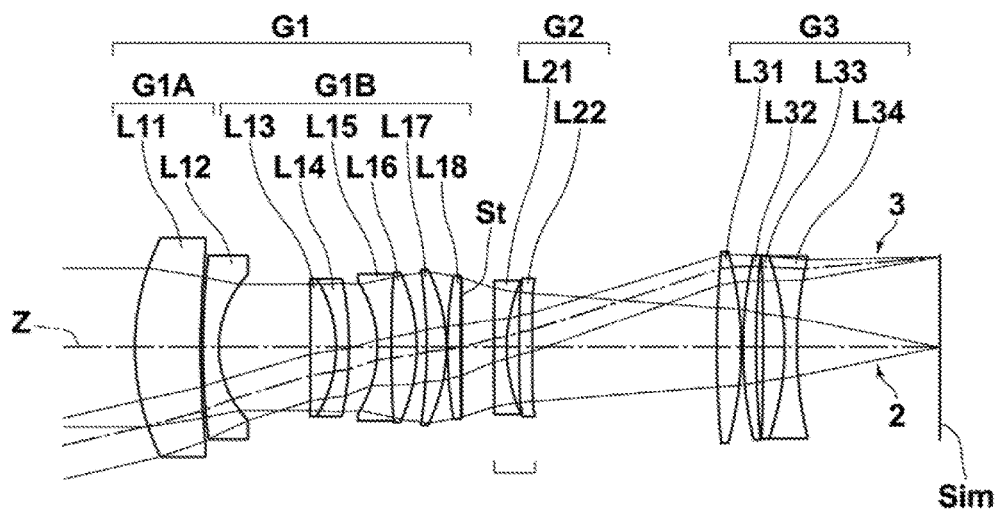
PROXIMAL
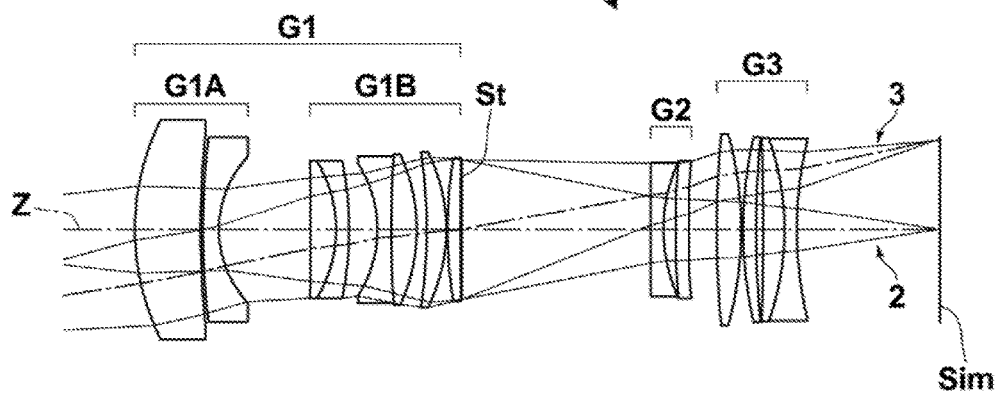

FIG.4
EXAMPLE 4
INFINITY
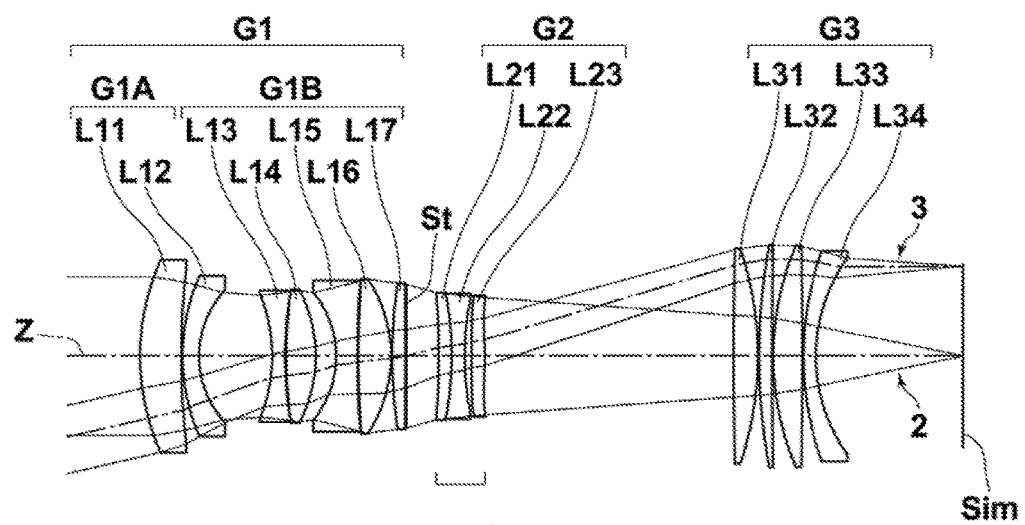
PROXIMAL
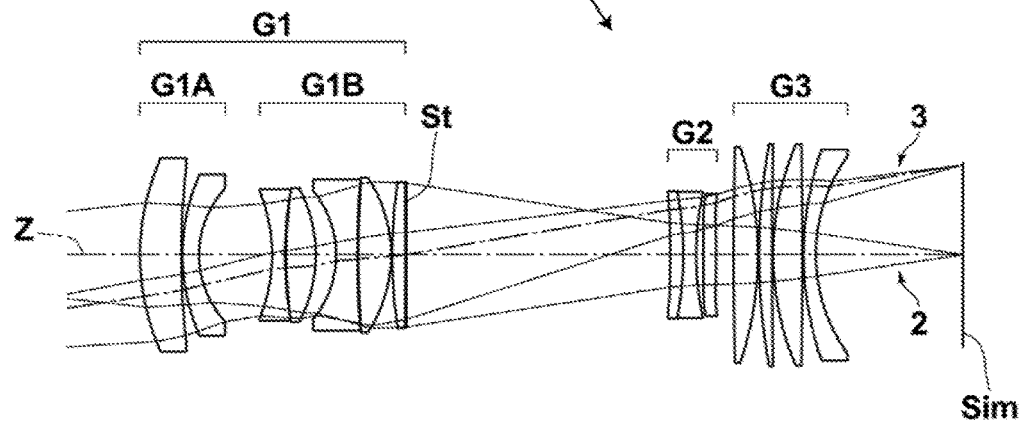

FIG.5
EXAMPLE 5
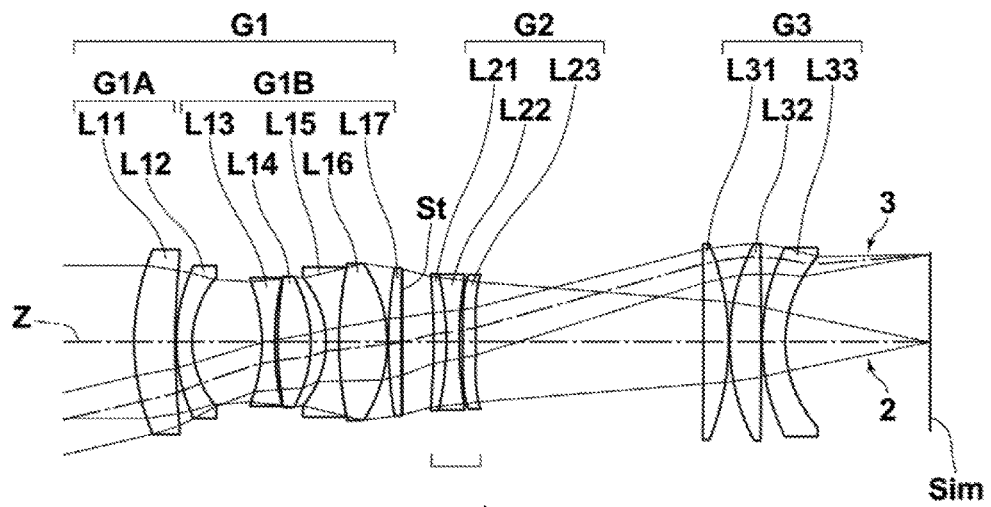
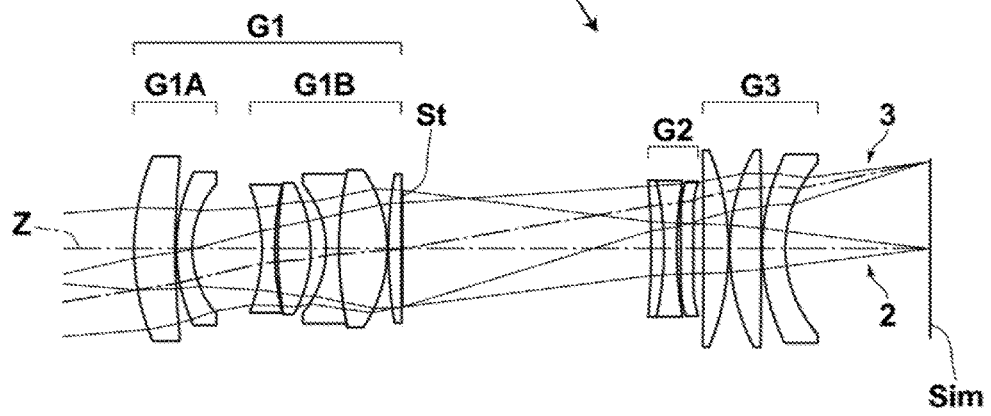

FIG.6
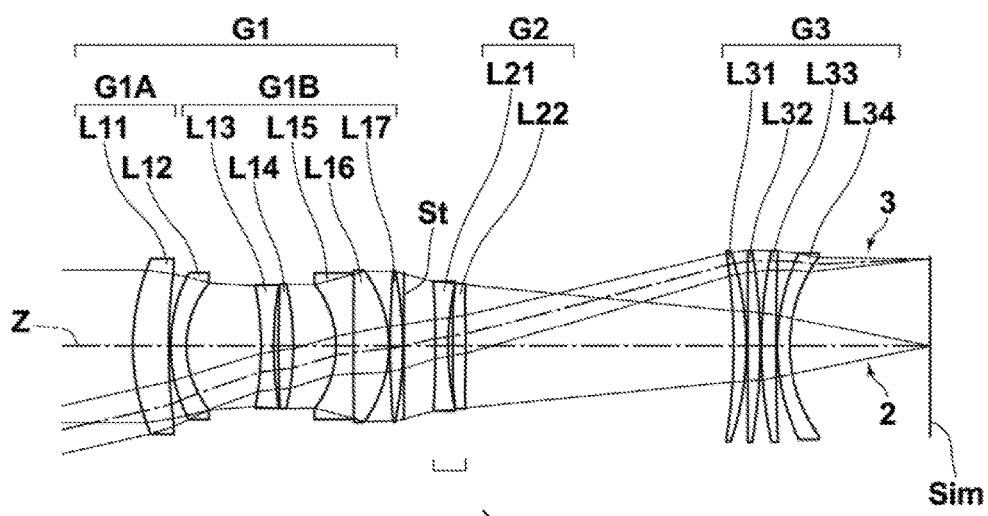
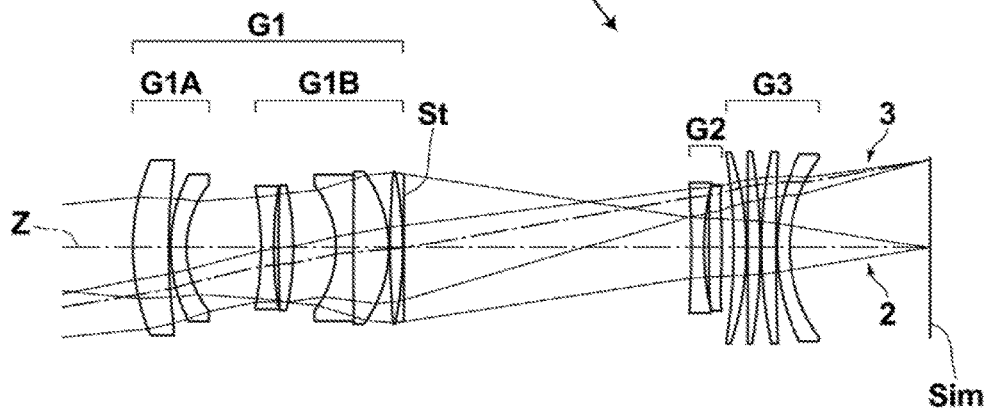

FIG.12
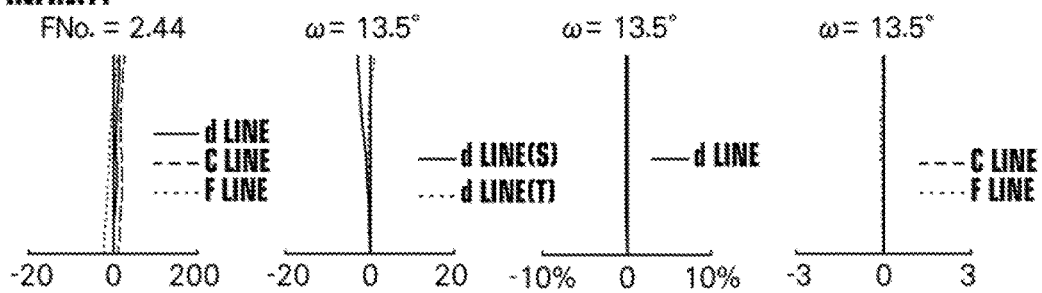
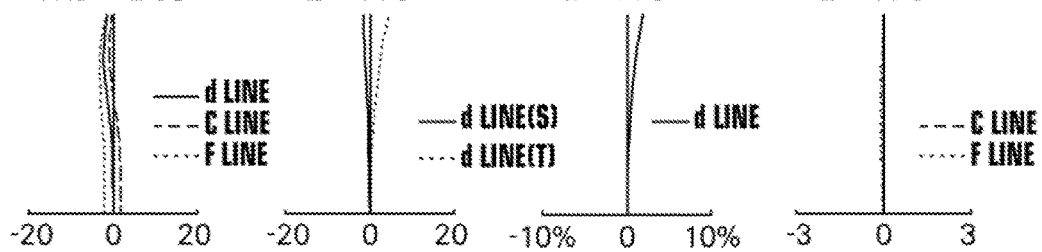
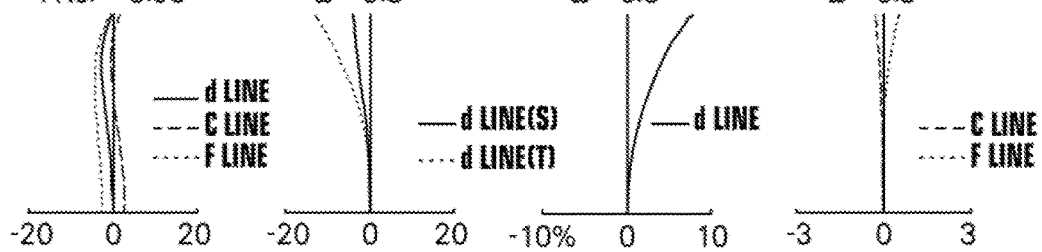

IMAGING LENS AND IMAGING APPARATUS

CROSS REFERENCE TO RELATED APPLICATIONS

The present application claims priority under 35 U.S.C. §119 to Japanese Patent Application No. 2015-115489 filed on Jun. 8, 2015. The above application is hereby expressly incorporated by reference, in its entirety, into the present application.

BACKGROUND

The present disclosure is related to an imaging lens. More particularly, the present disclosure is related to an imaging lens which is favorably suited for use in imaging apparatuses such as digital cameras, video cameras, and the like. In addition, the present disclosure is related to an imaging apparatus equipped with such an imaging lens.

Conventionally, imaging lenses that adopt the inner focus method, in which a portion of lens groups at an intermediate portion of a lens system is moved to perform focusing operations, have been proposed as imaging lenses for use in cameras in the above fields. It is easy to reduce the weight of focusing lens groups that move during focusing operations in the inner focus method, compared to the all lens group feeding method, in which the entire lens system is moved to perform focusing operations. Therefore, focusing operations having high operability and expedient automatic focus control are possible. Recently, video photography is often performed using digital cameras, and the use of lens systems that adopt the inner focus method having the above advantages is effective for such applications.

Known lens systems that adopt the inner focus method are disclosed in Japanese Unexamined Patent Publication Nos. 2013-003324 and 2013-161076. Japanese Unexamined Patent Publication Nos. 2013-003324 and 2013-161076 disclose lens systems that adopt the inner focus method, equipped with, in order from the object side to the image side, a first lens group having a positive refractive power, a second lens group having a negative refractive power, and a third lens group having a positive refractive power. In these lens systems, the second lens group is moved to perform focusing operations.

SUMMARY

However, the lens systems disclosed in Japanese Unexamined Patent Publication Nos. 2013-003324 and 2013-161076 are only capable of obtaining small reproduction ratios. There is demand for lens systems that adopt the inner focus method which are capable of photography with greater reproduction ratios. In addition, it is desired for fluctuations in aberrations caused by focusing operations to be small over a wide range of object distances, from infinity to a proximal distance.

The present disclosure has been developed in view of the foregoing circumstances. The present disclosure provides an imaging lens that adopts the inner focus method that is capable of obtaining a large reproduction ratio, in which fluctuations in aberrations caused by focusing operations is small, and which has favorable optical performance. The present disclosure also provides an imaging apparatus to which this imaging lens is applied.

An imaging lens of the present disclosure consists of, in order from the object side to the image side:

a first lens group having a positive refractive power;
a stop;
a second lens group having a negative refractive power; and
a third lens group having a positive refractive power;
only the second lens group moving in the direction of the optical axis to perform focusing operations;
the first lens group consisting of, in order from the object side to the image side, a first lens group front group and a first lens group rear group;
the first lens group front group consisting of, in order from the object side to the image side, one positive lens and one negative lens;
the first lens group rear group comprising at least two negative lenses and at least three positive lenses; and
the second lens group consisting of one or two positive lenses and one negative lens.

In the imaging lens of the present disclosure, it is preferable for at least one of Conditional Formulae (1) through (6), (9), (13), (1-1) through (6-1), (9-1), and (13-1) below to be satisfied.

$$0.4 < f1/f < 1 \tag{1}$$

$$0.5 < f1/f < 0.9 \tag{1-1}$$

$$0.6 < f1B/f1 < 1.2 \tag{2}$$

$$0.7 < f1B/f1 < 1.1 \tag{2-1}$$

$$0.2 < Nd1 - Nd2 < 0.7 \tag{3}$$

$$0.3 < Nd1 - Nd2 < 0.6 \tag{3-1}$$

$$35 < vd2 - vd1 < 75 \tag{4}$$

$$40 < vd2 - vd1 < 70 \tag{4-1}$$

$$1 < (R1f + R1r)/(R1r - R1f) < 2.5 \tag{5}$$

$$1.5 < (R1f + R1r)/(R1r - R1f) < 2.2 \tag{5-1}$$

$$0.8 < (R2f + R2r)/(R2f - R2r) < 5.5 \tag{6}$$

$$1 < (R2f + R2r)/(R2f - R2r) < 5 \tag{6-1}$$

$$0.5 < -f1/f2 < 1.3 \tag{9}$$

$$0.6 < -f1/f2 < 1.2 \tag{9-1}$$

$$0.6 < -f3/f2 < 1.7 \tag{13}$$

$$0.7 < -f3/f2 < 1.6 \tag{13-1}$$

wherein f1 is the focal length of the first lens group, f is the focal length of the entire lens system in a state focused on an object at infinity, f1B is the focal length of the first lens group rear group, Nd1 is the refractive index with respect to the d line of the positive lens within the first lens group front group, Nd2 is the refractive index with respect to the d line of the negative lens within the first lens group front group, vd2 is the Abbe's number with respect to the d line of the negative lens within the first lens group front group, vd1 is the Abbe's number with respect to the d line of the positive lens within the first lens group front group, R1f is the radius of curvature of the surface toward the object side of the positive lens within the first lens group front group, R1r is the radius of curvature of the surface toward the image side of the positive lens within the first lens group front group, R2f is the radius of curvature of the surface toward the object side of the negative lens within the first lens group front group, R2r is the radius of curvature of the surface toward the image side of the negative lens within the first lens group front group, f2 is the focal length of the second lens group, and f3 is the focal length of the third lens group.

In the imaging lens of the present disclosure, it is preferable for the first and second lenses from the object side within the first lens group rear group to have refractive powers of signs opposite each other, and for the third and fourth lenses from the object side within the first lens group rear group to have refractive powers of signs opposite each other. In the imaging lens of the present disclosure, the first lens group may consist of 8 or fewer lenses.

Note that the expression "consists of" above refers to essential elements. Lenses that practically do not have any power, optical elements other than lenses such as a stop, a cover glass, and filters, and mechanical components such as lens flanges, a lens barrel, an imaging element, a camera shake correcting mechanism, etc. may be included, in addition to the constituent elements listed above.

Note that in the imaging lens of the present disclosure, the signs of the refractive powers of the lens groups, the signs of the refractive powers of the lenses, the surface shapes of the lenses, and the values of the radii of curvature are those in the paraxial region for lenses that include aspherical surfaces.

The imaging apparatus of the present disclosure is equipped with an imaging lens of the present disclosure.

According to the present disclosure, the lens configurations of the first lens group and the second lens groups are favorably set in a lens system consisting of, in order from the object side to the image side, a positive first lens group, a stop, a negative second lens group and a positive third lens group, in which only the second lens group moves to perform focusing operations. Therefore, an imaging lens that adopts the inner focus method capable of obtaining a large reproduction ratio, in which fluctuations in aberrations caused by focusing operations are small, and which has favorable optical performance can be provided. In addition, an imaging apparatus equipped with this imaging lens can also be provided.

BRIEF DESCRIPTION OF THE DRAWINGS

FIG. 1 is a collection of sectional diagrams that illustrate the lens configuration of and the paths of light beams that pass through an imaging lens according to Example 1 of the present disclosure.

FIG. 2 is a collection of sectional diagrams that illustrate the lens configuration of and the paths of light beams that pass through an imaging lens according to Example 2 of the present disclosure.

FIG. 3 is a collection of sectional diagrams that illustrate the lens configuration of and the paths of light beams that pass through an imaging lens according to Example 3 of the present disclosure.

FIG. 4 is a collection of sectional diagrams that illustrate the lens configuration of and the paths of light beams that pass through an imaging lens according to Example 4 of the present disclosure.

FIG. 5 is a collection of sectional diagrams that illustrate the lens configuration of and the paths of light beams that pass through an imaging lens according to Example 5 of the present disclosure.

FIG. 6 is a collection of sectional diagrams that illustrate the lens configuration of and the paths of light beams that pass through an imaging lens according to Example 6 of the present disclosure.

FIG. 12 is a collection of diagrams that illustrate various aberrations of the imaging lens according to Example 6, which are spherical aberration, astigmatism, distortion, and lateral chromatic aberration in this order from the left side of the drawing sheet.

DETAILED DESCRIPTION OF THE PREFERRED EMBODIMENTS

Figure 7:
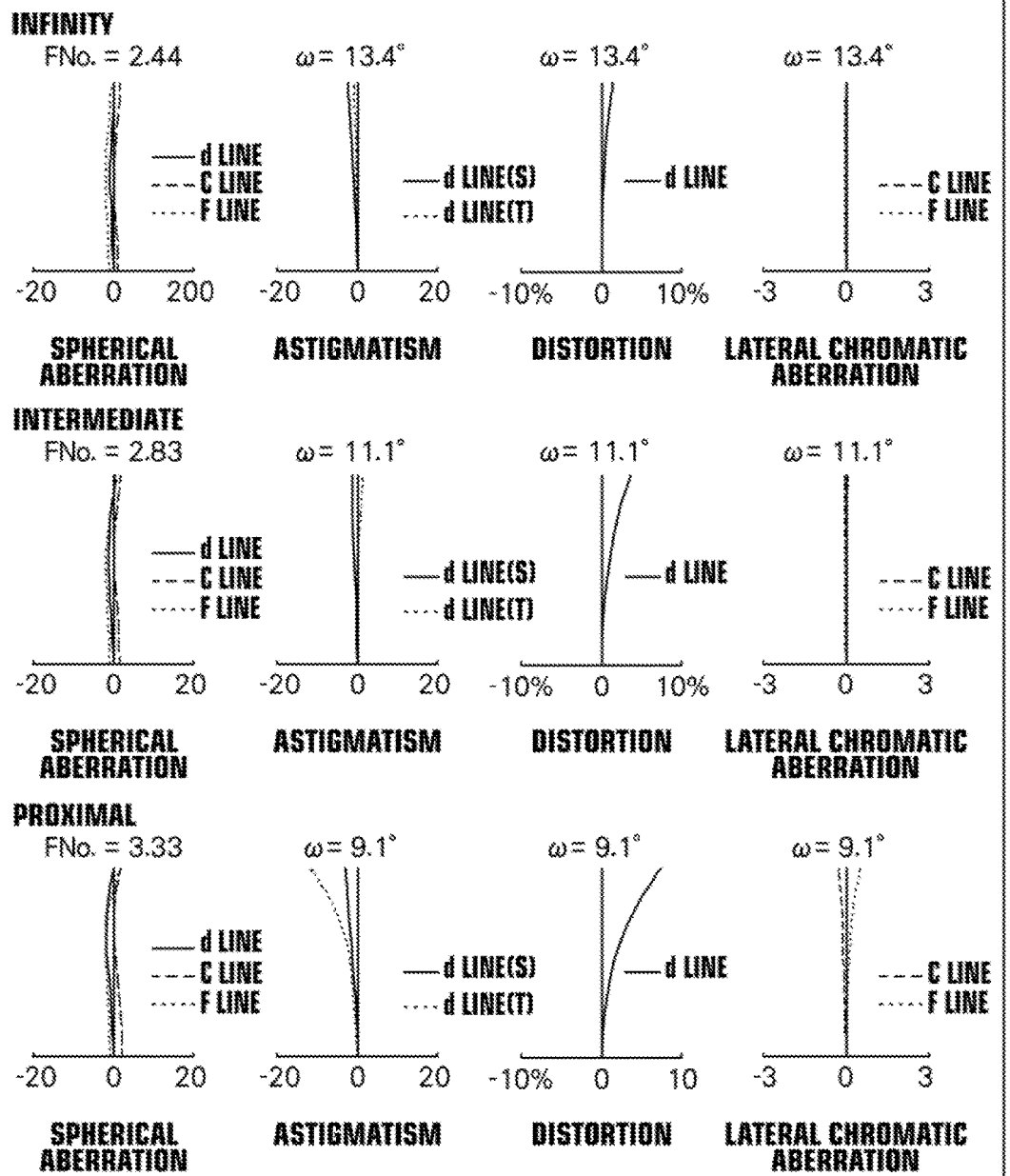
FIG. 7 is a collection of diagrams that illustrate various aberrations of the imaging lens according to Example 1, which are spherical aberration, astigmatism, distortion, and lateral chromatic aberration in this order from the left side of the drawing sheet.

Hereinafter, embodiments of the present disclosure will be described in detail with reference to the attached drawings. FIG. 1 through FIG. 6 are collections of cross sectional diagrams that illustrate the configurations of and the paths of light rays that pass through imaging lenses according to an embodiments of the present disclosure that respectively correspond to imaging lenses of Examples 1 through 6 to be described later. The basic configurations of the Examples illustrated in FIG. 1 through FIG. 6 and the manners in which the configurations are illustrated are the same. Therefore, the imaging lenses according to the embodiments of the present disclosure will be described mainly with reference to the example illustrated in FIG. 1.

In FIG. 1, the left side of the drawing sheet is the object side and the right side of the drawing sheet is the image side. The upper portion of FIG. 1 labeled "INFINITY" illustrates the arrangement of the optical system in a state focused on an object at infinity, and the lower portion of FIG. 1 labeled "PROXIMAL" illustrates the arrangement of the optical system in a state focused on an object at a proximate distance. FIG. 1 illustrates the optical paths of an axial light beam 2 and an off axis light beam 3 at a maximum angle of view.

This imaging lens is constituted by, along an optical axis Z in order from the object side to the image side: a first lens group G1 having a positive refractive power as a whole, an aperture stop St, a second lens group G2 having a negative refractive power as a whole, and a third lens group G3 having a positive refractive power as a whole. In the example illustrated in FIG. 1, the first lens group G1 is constituted by eight lenses, which are lenses L11 through L18, provided in this order from the object side to the image side. The second lens group G2 is constituted by three lenses, which are lenses L21 through L23, provided in this order from the object side to the image side. The third lens group G3 is constituted by four lenses, which are lenses L31 through L34, provided in this order from the object side to the image side. Note that the aperture stop St illustrated in FIG. 1 does not necessarily represent the size or the shape thereof, but the position thereof along the optical axis Z.

The imaging lens employs the inner focus method, in which only the second lens group G2 is moved along the optical axis Z with respect to an image formation plane Sim while the first lens group G1, the aperture stop St and the third lens group G3 are fixed with respect to the image formation plane Sim, to perform focusing operations. The example illustrated in FIG. 1 is that in which the second lens group G2 moves from the object side to the image side when changing focus from that on an object at infinity to that on an object at a proximal distance. The arrow illustrated between the upper portion and the lower portion of FIG. 1 indicates the direction of movement of the second lens group G2. Note that the arrow does not illustrate an accurate movement trajectory, but schematically shows the direction of movement.

This imaging lens is constituted by, in order from the object side to the image side, a positive lens group, the aperture stop St, a negative lens group, and a positive lens group. By adopting this configuration, which has favorably symmetric properties with respect to the aperture stop St, reducing fluctuations in aberrations when the reproduction ratio is enlarged will be facilitated. In addition, providing positive lens groups at both sides of the aperture stop St is advantageous from the viewpoint of correcting distortion. It is possible for the second lens group G2, which is the only negative lens group among the three lens groups, to have a strong negative refractive power. By designating the second lens group G2 as a focusing lens group, the distance that the focusing lens group moves during focusing operations can be shortened, which contributes to a shortening of the total length of the lens system.

The first lens group G1 is constituted by, in order from the object side to the image side, a first lens group front group G1A and a first lens group rear group G1B. The first lens group front group G1A is constituted by, in order from the object side to the image side, one positive lens and one negative lens. The first lens group rear group G1B includes at least two negative lenses and at least three positive lenses.

The positive lens within the first lens group front group G1A can correct distortion and lateral chromatic aberration. The negative lens within the first lens group front group G1A can suppress an increase in the diameter of the lens system as a whole while also suppressing spherical aberration. In the case that the negative lens within the first lens group front group G1A is of a meniscus shape, the above advantageous effects will become more prominent. The first lens group front group G1A may be constituted by, in order from the object side to the image side, a positive lens having a convex surface toward the object side, and a negative meniscus lens having a concave surface toward the image side, for example.

According to the configuration of the first lens group rear group G1B described above, negative refractive power and positive refractive power can be respectively distributed among a plurality of lenses. Thereby, higher order spherical aberration can be favorably corrected, a proximal distance at which focusing is possible can be set to be closer, and increasing the reproduction ratio can be facilitated.

It is preferable for the first and second lenses from the object side within the first lens group rear group G1B to have refractive powers of signs opposite each other, and for the third and fourth lenses from the object side within the first lens group rear group G1B to have refractive powers of signs opposite each other. That is, it is preferable for one of the first and second lenses from the object side within the first lens group rear group G1B to be a positive lens, and for the other to be a negative lens. In addition, it is preferable for one of the third and fourth lenses from the object side within the first lens group rear group G1B to be a positive lens, and for the other to be a negative lens. In the case that such a configuration is adopted, each of the pair of the first and second lenses from the object side and the pair of the third and fourth lenses from the object side within the first lens group rear group G1B can favorably correct spherical aberration and longitudinal chromatic aberration. In addition, the first lens group rear group G1B will be capable of favorably correcting higher order spherical aberration. Further, suppressing fluctuations in spherical aberration caused by focusing operations will be facilitated.

A positive lens may be provided at the most image side within the first lens group rear group G1B. In this case, this positive lens will facilitate favorable correction of spherical aberration and a shortening of the total length of the lens system.

Note that from the viewpoint of correcting aberrations, it is advantageous for the number of lenses to be greater. However, if the number of lenses within the first lens group G1, which is a lens group positioned at the object side of the aperture stop St, becomes excessively great, the diameter of the lens most toward the object side will become great. Therefore, it is preferable for the first lens group G1 to be constituted by eight or fewer lenses.

It is preferable for at least one of Conditional Formulae (1) through (7) below to be satisfied.

$$0.4 < f1/f < 1 \tag{1}$$

$$0.6 < f1B/f1 < 1.2 \tag{2}$$

$$0.2 < Nd1 - Nd2 < 0.7 \tag{3}$$

$$35 < vd2 - vd1 < 75 \tag{4}$$

$$1 < (R1f + R1r)/(R1r - R1f) < 2.5 \tag{5}$$

$$0.8 < (R2f + R2r)/(R2f - R2r) < 5.5 \tag{6}$$

$$0.16 < D4/f < 0.26 \tag{7}$$

wherein f1 is the focal length of the first lens group, f is the focal length of the entire lens system in a state focused on an object at infinity, f1B is the focal length of the first lens group rear group, Nd1 is the refractive index with respect to the d line of the positive lens within the first lens group front group, Nd2 is the refractive index with respect to the d line of the negative lens within the first lens group front group, vd2 is the Abbe's number with respect to the d line of the negative lens within the first lens group front group, vd1 is the Abbe's number with respect to the d line of the positive lens within the first lens group front group, R1f is the radius of curvature of the surface toward the object side of the positive lens within the first lens group front group, R1r is the radius of curvature of the surface toward the image side of the positive lens within the first lens group front group, R2f is the radius of curvature of the surface toward the object side of the negative lens within the first lens group front group, R2r is the radius of curvature of the surface toward the image side of the negative lens within the first lens group front group, and D4 is the distance along the optical axis between the first lens group front group and the first lens group rear group.

By configuring the imaging lens such that the value of f1/f is not less than or equal to the lower limit defined in Conditional Formula (1), the refractive power of the first lens group G1 can be prevented from becoming excessively strong. As a result, favorably correction of astigmatism and distortion will become possible. By configuring the imaging lens such that the value of f1/f is not greater than or equal to the upper limit defined in Conditional Formula (1), the refractive power of the first lens group G1 can be prevented from becoming excessively weak. As a result, such a configuration contributes to a shortening of the total length of the lens system.

By configuring the imaging lens such that the value of f1B/f1 is not less than or equal to the lower limit defined in Conditional Formula (2), the refractive power of the first lens group rear group G1B can be prevented from becoming excessively strong. As a result, favorably correction of astigmatism and spherical aberration will become possible, or this configuration will contribute to a shortening of the total length of the lens system. By configuring the imaging lens such that the value of f1B/f1 is not greater than or equal to the upper limit defined in Conditional Formula (2), an increase in the diameter of the lens provided most toward the object side can be suppressed. As a result, such a configuration contributes to miniaturization of the lens system.

By configuring the imaging lens such that the value of Nd1−Nd2 is not less than or equal to the lower limit defined in Conditional Formula (3), increases in the diameters of the positive lens and the negative lens within the first lens group front group G1A can be suppressed. By configuring the imaging lens such that the value of Nd1−Nd2 is not greater than or equal to the upper limit defined in Conditional Formula (3), spherical aberration can be favorably suppressed.

By configuring the imaging lens such that the value of νd2−νd1 is not less than or equal to the lower limit defined in Conditional Formula (4), lateral chromatic aberration can be favorably corrected, without the correction being insufficient. By configuring the imaging lens such that the value of νd2−νd1 is not greater than or equal to the upper limit defined in Conditional Formula (4), lateral chromatic aberration can be favorably corrected, without the correction being excessive.

By configuring the imaging lens such that the value of (R1f+R1r)/(R1r−R1f) is not less than or equal to the lower limit defined in Conditional Formula (5), distortion and lateral chromatic aberration can be suppressed. By configuring the imaging lens such that the value of (R1f+R1r)/(R1r−R1f) is not greater than or equal to the upper limit defined in Conditional Formula (5), spherical aberration can be suppressed.

By configuring the imaging lens such that the value of (R2f+R2r)/(R2f−R2r) is not less than or equal to the lower limit defined in Conditional Formula (6), distortion can be suppressed. By configuring the imaging lens such that the value of (R2f+R2r)/(R2f−R2r) is not greater than or equal to the upper limit defined in Conditional Formula (6), favorable correction of spherical aberration or chromatic aberrations will be facilitated.

By configuring the imaging lens such that the value of D4/f is not less than or equal to the lower limit defined in Conditional Formula (7), increases in the diameters of lenses can be suppressed. By configuring the imaging lens such that the value of D4/f is not greater than or equal to the upper limit defined in Conditional Formula (7), the total length of the lens system can be maintained short.

The second lens group G2 is constituted by one or two positive lenses and one negative lens. As can be understood from FIG. 1, the optical path of the off axis light beam 3 through the second lens group G2 differs in the state focused on an object at infinity and the state focused on an object at a proximal distance. By the focusing lens group having a configuration that includes both a positive lens and a negative lens, fluctuations in lateral chromatic aberration caused by focusing operations can be suppressed, and increasing the reproduction ratio is facilitated. In addition, by the number of lenses that constitute the second lens group G2 being two or three, weight reduction of the focusing lens group can be achieved.

The second lens group G2 may be of a three lens configuration constituted by, in order from the object side to the image side, a cemented lens formed by cementing a positive lens and a negative lens, provided in this order from the object side to the image side, together, and a positive lens, for example. In the case that the second lens group G2 includes a cemented lens formed by a positive and a negative lens together, such a configuration is advantageous from the viewpoint of correcting lateral chromatic aberration. Alternatively, the second lens group G2 may be of a two lens configuration constituted by, in order from the object side to the image side, a negative lens and a positive lens. In the case that the second lens group G2 is of a two lens configuration, such a configuration is advantageous from the viewpoint of reducing the weight of the focusing lens group. In both of the three lens configuration and the two lens configuration described above, the positive lens provided most toward the image side within the second lens group G2 will facilitate suppression of fluctuations in spherical aberration caused by focusing operations.

With respect to the second lens group G2, it is preferable for Conditional Formula (8) below to be satisfied.

$$0.4 < -f2/f < 1.3 \quad (8)$$

wherein f2 is the focal length of the second lens group, and f is the focal length of the entire lens system in a state focused on an object at infinity.

By configuring the imaging lens such that the value of −f2/f is not less than or equal to the lower limit defined in Conditional Formula (8), the refractive power of the second lens group G2 can be prevented from becoming excessively strong. As a result, favorable correction of longitudinal chromatic aberration is facilitated, spherical aberration can be favorably corrected in a state focused on an object at a proximal distance, and further, fluctuations in aberrations caused by focusing operations can be suppressed. By configuring the imaging lens such that the value of −f2/f is not greater than or equal to the upper limit defined in Conditional Formula (8), the refractive power of the second lens group G2 can be prevented from becoming excessively weak. As a result, the amount of movement of the focusing lens group during focusing operations can be decreased, which contributes to a shortening of the total length of the lens system.

In addition, with respect to the first lens group G1 and the second lens group G2, it is preferable for Conditional Formula (9) below to be satisfied.

$$0.5 < -f1/f2 < 1.3 \qquad (9)$$

wherein f1 is the focal length of the first lens group, and f2 is the focal length of the second lens group.

By configuring the imaging lens such that the value of −f1/f2 is not less than or equal to the lower limit defined in Conditional Formula (9), the refractive power of the first lens group G1 can be prevented from becoming excessively strong, or the refractive power of the second lens group G2 can be prevented from excessively weak. As a result, it will become possible to favorably correct astigmatism and distortion. By configuring the imaging lens such that the value of −f1/f2 is not greater than or equal to the upper limit defined in Conditional Formula (9), the refractive power of the first lens group G1 can be prevented from becoming excessively weak, or the refractive power of the second lens group G2 can be prevented from excessively strong. As a result, correction of longitudinal chromatic aberration will be facilitated, and excessive correction of spherical aberration when focused on an object at a proximal distance can be prevented.

With respect to the negative lens within the second lens group G2, it is preferable for at least one of Conditional Formulae (10) through (12) below to be satisfied.

$$1.65 < NG2n < 2.2 \qquad (10)$$

$$28 < vG2n < 60 \qquad (11)$$

$$-0.3 < (RG2nf + RG2nr)/(RG2nf - RG2nr) < 1.8 \qquad (12)$$

wherein NG2n is the refractive index with respect to the d line of the negative lens within the second lens group, vG2n is the Abbe's number with respect to the d line of the negative lens within the second lens group, RG2nf is the radius of curvature of the surface toward the object side of the negative lens within the second lens group, and RG2nr is the radius of curvature of the surface toward the image side of the negative lens within the second lens group.

By configuring the imaging lens such that the value of NG2n is not less than or equal to the lower limit defined in Conditional Formula (10), increasing the negative refractive power of the second lens group G2 will be facilitated. As a result, shortening of the amount of movement of the focusing lens group during focusing operations will be facilitated, which contributes to a shortening of the total length of the lens system. By configuring the imaging lens such that the value of NG2n is not greater than or equal to the upper limit defined in Conditional Formula (10), materials having high dispersion can be avoided when selecting a material from currently available optical materials. As a result, fluctuations in aberrations caused by focusing operations can be suppressed.

By configuring the imaging lens such that the value of vG2n is not less than or equal to the lower limit defined in Conditional Formula (11), favorable correction of lateral chromatic aberration without the correction being insufficient will be facilitated. By configuring the imaging lens such that the value of vG2n is not greater than or equal to the upper limit defined in Conditional Formula (11), favorable correction of lateral chromatic aberration without the correction being excessive will be facilitated.

By configuring the imaging lens such that the value of (RG2nf+RG2nr)/(RG2nf−RG2nr) is not less than or equal to the lower limit defined in Conditional Formula (12), correction of spherical aberration at the second lens group G2, which is the focusing lens group, becoming insufficient can be prevented. As a result, spherical aberrations can be favorably corrected in balance with the other lens groups. In addition, fluctuations in spherical aberration caused by focusing operations can also be suppressed. By configuring the imaging lens such that the value of (RG2nf+RG2nr)/(RG2nf−RG2nr) is not greater than or equal to the upper limit defined in Conditional Formula (12), correction of spherical aberration at the second lens group G2 becoming excessive can be prevented. As a result, favorable correction of spherical aberration will be facilitated.

In addition, with respect to the second lens group G2 and the third lens group G3, it is preferable for Conditional Formula (13) below to be satisfied.

$$0.6 < -f3/f2 < 1.7 \qquad (13)$$

wherein f3 is the focal length of the third lens group, and f2 is the focal length of the second lens group.

By configuring the imaging lens such that the value of −f3/f2 is not less than or equal to the lower limit defined in Conditional Formula (13), the refractive power of the third lens group G3 can be prevented from becoming excessively strong, or the refractive power of the second lens group G2 can be prevented from becoming excessively weak. As a result, it will become possible to favorably correct spherical aberration, astigmatism, and distortion. By configuring the imaging lens such that the value of −f3/f2 is not greater than or equal to the upper limit defined in Conditional Formula (13), fluctuations in aberrations caused by focusing operations can be suppressed.

A preferred aspect of the third lens group G3 is that which is constituted by, in order from the object side to the image side, two or three positive lenses, and one negative lens. As can be understood from FIG. 1, the optical path of the off axis light beam 3 through the third lens group G3 differs in the state focused on an object at infinity and the state focused on an object at a proximal distance. In the case that the third lens group G3 has two or three positive lenses, the positive refractive power of the third lens group can be distributed among these positive lenses. As a result, distortion moving greatly toward the positive direction when changing focus from that on an object at infinity to that on an object at a proximal distance can be prevented, and increasing the reproduction ratio will be facilitated.

Note that in the case that the two or three positive lenses are provided consecutively, and then the negative lens is provided at the image side thereof in the third lens group G3, the advantageous effects described above with respect to distortion can be favorably obtained. Assuming a case in which the third lens group G3, which is constituted by two or three positive lenses and one negative lens, is configured such that the two or three positive lenses are provided non consecutively, or the negative lens is provided at a position other than at the most image side within the third lens group G3, light rays will receive the converging effect of a positive lens after receiving a dispersing effect of the negative lens, and will move vertically. In such a case, the advantageous effects described above with respect to distortion cannot be favorably obtained.

In the case that the positive refractive power of the third lens group G3 is distributed among a plurality of positive lenses as in the preferred aspect described above, spherical aberration can be favorably suppressed. In the case that the third lens group G3 assumes the preferred aspect described above, correction of spherical aberration by the positive lens provided most toward the object side within the third lens group G3, correction of spherical aberration and longitudinal chromatic aberration by the positive lens provided second from the object side within the third lens group G3, and correction of longitudinal aberration and distortion by the negative lens provided most toward the image side within the third lens group G3 will be facilitated.

In the case that the third lens group G3 assumes the preferred aspect described above, it is preferable for the negative lens within the third lens group G3 to be a meniscus lens having a concave surface toward the image side. In this case, such a configuration is even more advantageous from the viewpoint of favorably correcting distortion.

In addition, in the case that the third lens group G3 assumes the preferred aspect described above, it is preferable for at least one of Conditional Formulae (14) through (16) below to be satisfied.

$$0.6 < f3/f < 1.2 \tag{14}$$

$$0.5 < f1/f3 < 1.2 \tag{15}$$

$$-0.5 < (RG3nf + RG3nr)/(RG3nf - RG3nr) < 10 \tag{16}$$

wherein f3 is the focal length of the third lens group, f is the focal length of the entire lens system in a state focused on an object at infinity, f1 is the focal length of the first lens group, RG3nf is the radius of curvature of the surface toward the object side of the negative lens within the third lens group, and RG3nr is the radius of curvature of the surface toward the image side of the negative lens within the third lens group.

By configuring the imaging lens such that the value of f3f is not less than or equal to the lower limit defined in Conditional Formula (14), the refractive power of the third lens group G3 can be prevented from becoming excessively strong. As a result, spherical aberration can be suppressed. By configuring the imaging lens such that the value of f3/f is not greater than or equal to the upper limit defined in Conditional Formula (14), the refractive power of the third lens group G3 can be prevented from becoming excessively weak. As a result, the incident angles of principal light rays at peripheral angles of view into the image formation plane Sim can be decreased.

By configuring the imaging lens such that the value of f1/f3 is not less than or equal to the lower limit defined in Conditional Formula (15), the refractive power of the first lens group G1 can be prevented from becoming excessively strong, or the refractive power of the third lens group G3 can be prevented from becoming excessively weak. As a result, the generation of astigmatism and field curvature can be suppressed, or the incident angles of principal light rays at peripheral angles of view into the image formation plane Sim can be decreased. By configuring the imaging lens such that the value of f1/f3 is not greater than or equal to the upper limit defined in Conditional Formula (15), the refractive power of the first lens group G1 can be prevented from becoming excessively weak, or the refractive power of the third lens group G3 can be prevented from becoming excessively strong. As a result, increases in the diameters of lenses within the first lens group G1 can be suppressed, or spherical aberration can be suppressed.

By configuring the imaging lens such that the value of (RG3nf+RG3nr)/(RG3nf−RG3nr) is not less than or equal to the lower limit defined in Conditional Formula (16), distortion can be suppressed. By configuring the imaging lens such that the value of (RG3nf+RG3nr)/(RG3nf−RG3nr) is not greater than or equal to the upper limit defined in Conditional Formula (16), it will become possible to favorably correct spherical aberration or chromatic aberrations.

It is more preferable for Conditional Formulae (1-1) through (16-1) below to be satisfied within the ranges of Conditional Formulae (1) through (16), to cause the advantageous effects related to each of Conditional Formulae (1) through (16) to become more prominent.

$$0.5 < f1/f < 0.9 \tag{1-1}$$

$$0.7 < f1B/f1 < 1.1 \tag{2-1}$$

$$0.3 < Nd1 - Nd2 < 0.6 \tag{3-1}$$

$$40 < vd2 - vd1 < 70 \tag{4-1}$$

$$1.5 < (R1f + R1r)/(R1r - R1f) < 2.2 \tag{5-1}$$

$$1 < (R2f + R2r)/(R2f - R2r) < 5 \tag{6-1}$$

$$0.17 < D4/f < 0.25 \tag{7-1}$$

$$0.5 < -f2/f < 1.2 \tag{8-1}$$

$$0.6 < -f1/f2 < 1.2 \tag{9-1}$$

$$1.7 < NG2n < 2.1 \tag{10-1}$$

$$30 < vG2n < 55 \tag{11-1}$$

$$-0.2 < (RG2nf + RG2nr)/(RG2nf - RG2nr) < 1.5 \tag{12-1}$$

$$0.7 < -f3/f2+ < 1.6 \tag{13-1}$$

$$0.7 < f3/f < 1.1 \tag{14-1}$$

$$0.6 < f1/f3 < 1.1 \tag{15-1}$$

$$-0.3 < (RG3nf + RG3nr)/(RG3nf - RG3nr) < 9 \tag{16-1}$$

Note that although not illustrated in FIG. 1, various filters such as a low pass filter and an infrared cutoff filter may be provided between the imaging lens and the image formation plane Sim or among each of the lenses, depending on the specifications of an imaging apparatus, in the case that this imaging lens is mounted on an imaging apparatus. In addition, a protective member such as a cover glass may be provided at the image side or at the object side of the imaging lens.

Arbitrary combinations of the preferred configurations and possible configurations described above, including the configurations related to the conditional formulae, are possible. It is preferable for these configurations to be adopted according to desired specifications. An imaging lens that adopts the inner focus method which is compact, has a large reproduction ratio, little fluctuations in aberrations caused by focusing operations, has favorable optical performance can be realized by appropriately adopting the configurations described above, for example. Note that here a "large reproduction ratio" refers to a reproduction ratio of 0.6x or higher.

Next, examples of the numerical values of the imaging lens of the present disclosure will be described. Examples 1 through 6 described below are normalized such that the focal length of the entire lens system is 1.00 in a state focused on an object at infinity.

EXAMPLE 1

The lens configuration of and the paths of light beams through an imaging lens of Example 1 are illustrated in FIG.

1. Note that the manner in which the imaging lens is illustrated has been described above, and therefore redundant descriptions will be omitted here. The imaging lens of Example 1 is constituted by, in order from the object side to the image side, a first lens group G1 having a positive refractive power, an aperture stop St, a second lens group G2 having a negative refractive power, and a third lens group G3 having a positive refractive power. Only the second lens group G2 is a focusing lens group. When changing focus from that on an object at infinity to that on an object at a proximal distance, the second lens group G2 moves toward the image side. Note that the points that the imaging lens is of a three group configuration, the signs of the refractive powers of each of the lens groups, and the method by which focusing operations are performed are common to the imaging lenses of Examples 2 through 6 to be described later.

In the imaging lens of Example 1, the first lens group G1 is constituted by, in order from the object side to the image side, a first lens group front group G1A and a first lens group rear group G1B. The first lens group front group G1A is constituted by, in order from the object side to the image side, two lenses, which are lenses L11 and L12. The first lens group rear group G1B is constituted by, in order from the object side to the image side, six lenses, which are lenses L13 through L18. The second lens group G2 is constituted by, in order from the object side to the image side, three lenses, which are lenses L21 through L23. The third lens group G3 is constituted by, in order rom the object side to the image side, four lenses, which are lenses L31 through L34.

Table 1 shows basic lens data of the imaging lens of Example 1. Table 2 shows aspherical surface coefficients of the imaging lens of Example 1. Table 3 shows various items and the values of variable distances among surfaces of the imaging lens of Example 1. In Table 1, ith (i=1, 2, 3, . . . ) lens surface numbers that sequentially increase from the object side to the image side, with the surface of the constituent element at the most object side designated as first, are shown in the column Si. The radii of curvature of ith surfaces are shown in the column Ri. The distances between an ith surface and an i+1 st surface along the optical axis Z are shown in the column Di. The refractive indices with respect to the d line (wavelength: 587.6 nm) of jth (j=1, 2, 3, . . . ) constituent elements that sequentially increase from the object side to the image side, with the constituent element at the most object side designated as first, are shown in the column Ndj. The Abbe's numbers with respect to the d line of jth constituent elements are shown in the column vdj.

Here, the signs of the radii of curvature are positive in cases that the surface shape is convex toward the object side, and negative in cases that the surface shape is convex toward the image side. Table 1 also shows the aperture stop St. Text reading "(St)" is shown in the row of the surface number for the surface corresponding to the aperture stop St. The value in the lowermost row of column Di is the distance between the surface most toward the image side within the table and an image formation plane Sim.

In Table 1, the surface numbers of aspherical surfaces are denoted with the mark "*", and the radii of curvature of paraxial regions are shown as the radii of curvature of the aspherical surfaces. Table 2 shows aspherical surface data for the imaging lens of Example 1. In the numerical values of the aspherical surface data of Table 2, "E+n (n: integer)" means "·10$^{+n}$". Note that the aspherical surface coefficients are the values of the coefficients KA and Am (m=4, 6, 8, 10) in the following aspherical surface formula:

$$Zd = C \cdot h^2 / 1 + (1 - KA \cdot C^2 \cdot h^2)^{1/2} + \Sigma Am \cdot h^m \qquad \text{[Formula 1]}$$

wherein Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the paraxial curvature, and KA and Am are aspherical surface coefficients (m=4, 6, 8, 10).

In addition, Table 1 shows text reading "DD [ ]" for variable distances among surfaces that change during focusing operations, and the surface number of the surface toward the object side is shown within the brackets "[ ]". Table 3 shows the reproduction ratio, the focal length f' of the entire lens system, the F number F No., the maximum full angle of view 2ω, and the values of the variable distances with reference to the d line.) "(°)" shown in the column 2ω indicates that the units are degrees. Table 3 shows values for each of the above items for a state focused on an object at infinity, a state focused on an object at an intermediate distance, and a state focused on an object at a proximal distance in the columns labeled "Infinity", "Intermediate", and "Proximal". Note that the numerical values shown in each of the tables below are rounded off at a predetermined number of digits.

TABLE 1

Example 1

| Si | Ri | Di | Ndj | vdj |
|---|---|---|---|---|
| 1 | 0.63204 | 0.091 | 2.00100 | 29.13 |
| 2 | 2.26470 | 0.003 | | |
| 3 | 0.53092 | 0.042 | 1.43875 | 94.94 |
| 4 | 0.25894 | 0.179 | | |
| 5 | −0.43611 | 0.033 | 1.72825 | 28.46 |
| 6 | 0.97373 | 0.003 | | |
| 7 | 1.19506 | 0.069 | 1.74100 | 52.64 |
| 8 | −0.36029 | 0.036 | | |
| 9 | −0.27528 | 0.033 | 1.80518 | 25.42 |
| 10 | 1.04268 | 0.112 | 1.91082 | 35.25 |
| 11 | −0.38714 | 0.003 | | |
| 12 | −3.78334 | 0.033 | 1.63980 | 34.47 |
| 13 | −7.14791 | 0.003 | | |
| 14 | 1.60570 | 0.033 | 1.95375 | 32.32 |
| 15 | −5.97366 | 0.003 | | |
| 16 (St) | ∞ | DD [16] | | |
| 17 | −2.27046 | 0.033 | 1.89286 | 20.36 |
| 18 | −0.80135 | 0.033 | 1.88100 | 40.14 |
| 19 | 0.81707 | 0.010 | | |
| *20 | −112209.57870 | 0.033 | 1.74320 | 49.29 |
| *21 | −2.64435 | DD [21] | | |
| 22 | 18.82478 | 0.053 | 1.43875 | 94.94 |
| 23 | −0.96415 | 0.003 | | |
| 24 | 4.56711 | 0.035 | 1.91082 | 35.25 |
| 25 | −2.64812 | 0.003 | | |
| 26 | 0.81084 | 0.061 | 1.49700 | 81.54 |
| 27 | 5.33412 | 0.003 | | |
| 28 | 0.52444 | 0.034 | 1.84666 | 23.78 |
| 29 | 0.40902 | 0.372 | | |

TABLE 2

Example 1

| | Surface Number | |
|---|---|---|
| | 20 | 21 |
| KA | −5.3864616E+13 | −9.9124092E+01 |
| A4 | 1.0712889E+01 | 9.7459703E+00 |
| A6 | 8.1918456E+01 | 1.1295672E+02 |

TABLE 2-continued

Example 1

| | Surface Number | |
|---|---|---|
| | 20 | 21 |
| A8 | −3.7482135E+02 | −8.8666278E+02 |
| A10 | 1.5318435E+04 | 2.7944816E+04 |

TABLE 3

Example 1

| | Infinity | Intermediate | Proximal |
|---|---|---|---|
| Reproduction Ratio | 0.0 | 0.3 | 0.7 |
| f' | 1.00 | 1.12 | 0.84 |
| F No. | 2.44 | 2.83 | 3.33 |
| 2ω (°) | 26.8 | 22.2 | 18.2 |
| DD [16] | 0.082 | 0.293 | 0.711 |
| DD [21] | 0.650 | 0.438 | 0.021 |

Diagrams that illustrate various aberrations of the imaging lens of Example 1 are illustrated in FIG. 7. Note that the diagrams in the upper portion of FIG. 7 illustrate spherical aberration, astigmatism, distortion, and lateral chromatic aberration in a state focused on an object at infinity from the left to the right of the drawing sheet, the diagrams in the middle portion of FIG. 7 illustrate spherical aberration, astigmatism, distortion, and lateral chromatic aberration in a state focused on an object at an intermediate distance from the left to the right of the drawing sheet, and the diagrams in the lower portion of FIG. 7 illustrate spherical aberration, astigmatism, distortion, and lateral chromatic aberration in a state focused on an object at a proximal distance from the left to the right of the drawing sheet. The diagrams that illustrate spherical aberration show aberrations related to the d line (wavelength: 587.6 nm), aberrations related to the C line (wavelength: 656.3 nm), and aberrations related to the F line (wavelength: 486.1 nm) as black solid lines, long broken lines, and short broken lines, respectively. In the diagrams that illustrate astigmatism, aberrations in the sagittal direction are indicated by solid lines, while aberrations in the tangential direction are indicated by short broken lines, which are respectively labeled with the letters "(S)" and "(T)". In the diagrams that illustrate distortion, aberrations related to the d line are shown by solid lines. In the diagrams that illustrate lateral chromatic aberration, aberrations related to the C line and aberrations related to the F line are shown as long broken lines and short broken lines, respectively. Note that in the diagrams that illustrate spherical aberrations, "FNo." denotes F numbers. In the other diagrams that illustrate the aberrations, "ω" denotes half angles of view.

The symbols, meanings, and the manners in which each item of data is shown in the description of Example 1 applies to the other Examples unless particularly noted. Therefore, redundant descriptions will be omitted hereinbelow.

EXAMPLE 2

Figure 8:
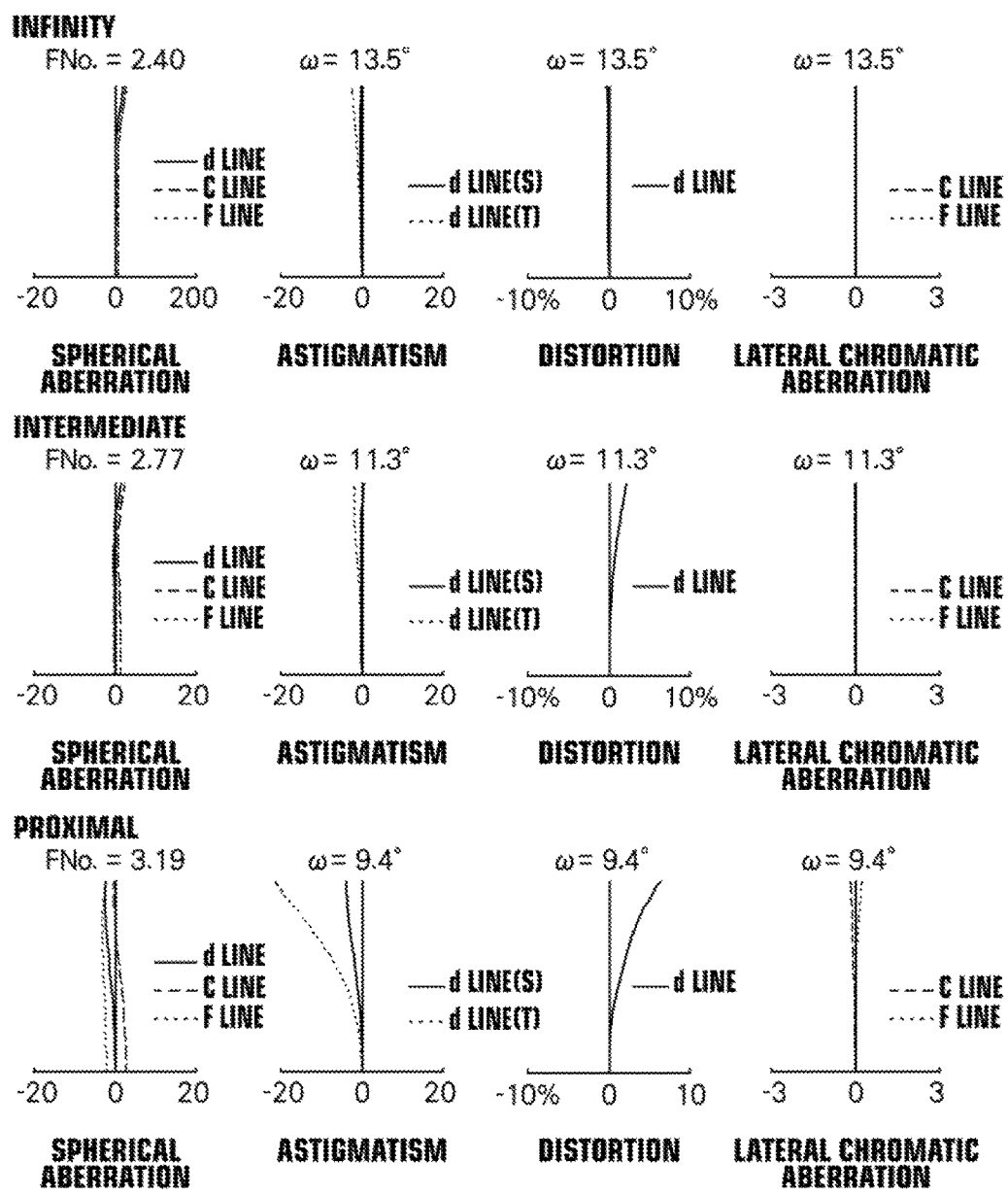
FIG. 8 is a collection of diagrams that illustrate various aberrations of the imaging lens according to Example 2, which are spherical aberration, astigmatism, distortion, and lateral chromatic aberration in this order from the left side of the drawing sheet.

The lens configuration of and the paths of light beams through an imaging lens of Example 2 are illustrated in FIG. 2. In the imaging lens of Example 2, the first lens group G1 is constituted by, in order from the object side to the image side, a first lens group front group G1A and a first lens group rear group G1B. The first lens group front group G1A is constituted by, in order from the object side to the image side, two lenses, which are lenses L11 and L12. The first lens group rear group G1B is constituted by, in order from the object side to the image side, six lenses, which are lenses L13 through L18. The second lens group G2 is constituted by, in order from the object side to the image side, two lenses, which are a lens L21 and a lens L22. The third lens group G3 is constituted by, in order from the object side to the image side, four lenses, which are lenses L31 through L34. Table 4 shows basic lens data of the imaging lens of Example 2. Table 5 shows aspherical surface coefficients of the imaging lens of Example 2. Table 6 shows various items and the values of variable distances among surfaces of the imaging lens of Example 2. Diagrams that illustrate various aberrations of the imaging lens of Example 2 are illustrated in FIG. 8.

TABLE 4

Example 2

| Si | Ri | Di | Ndj | νdj |
|---|---|---|---|---|
| 1 | 0.61822 | 0.166 | 1.95375 | 32.32 |
| 2 | 2.51407 | 0.020 | | |
| 3 | 2.15700 | 0.052 | 1.49700 | 81.54 |
| 4 | 0.28283 | 0.241 | | |
| 5 | 4.40896 | 0.089 | 1.75500 | 52.32 |
| 6 | −0.32888 | 0.033 | 1.89286 | 20.36 |
| 7 | −1.02588 | 0.036 | | |
| 8 | −0.31467 | 0.041 | 1.80000 | 29.84 |
| 9 | 2.78021 | 0.073 | 1.65160 | 58.55 |
| 10 | −0.47471 | 0.011 | | |
| 11 | −1.43329 | 0.047 | 1.95375 | 32.32 |
| 12 | −0.46809 | 0.003 | | |
| 13 | 1.27109 | 0.033 | 1.95375 | 32.32 |
| 14 | 9.80529 | 0.003 | | |
| 15 (St) | ∞ | DD [15] | | |
| 16 | 5.07225 | 0.033 | 1.75500 | 52.32 |
| 17 | 0.45450 | 0.031 | | |
| *18 | −41.77007 | 0.033 | 1.51633 | 64.06 |
| *19 | 139.47539 | DD [19] | | |
| 20 | −38.15026 | 0.049 | 1.95375 | 32.32 |
| 21 | −0.92788 | 0.003 | | |
| 22 | 0.86401 | 0.036 | 1.90366 | 31.31 |
| 23 | 1.82375 | 0.013 | | |
| 24 | 5.22997 | 0.046 | 1.95375 | 32.32 |
| 25 | −1.25360 | 0.003 | | |
| 26 | −1.52673 | 0.033 | 1.80518 | 25.42 |
| 27 | 0.82695 | 0.360 | | |

TABLE 5

Example 2

| Surface Number | 18 | 19 |
|---|---|---|
| KA | 5.0331526E+04 | 7.6941132E+04 |
| A4 | 7.5673513E+00 | 8.3136771E+00 |
| A6 | 1.4506726E+01 | −1.8674367E+01 |
| A8 | −1.5755261E+03 | 4.6999687E+01 |
| A10 | 3.8046507E+04 | 8.9188892E+03 |

TABLE 6

Example 2

| | Infinity | Intermediate | Proximal |
|---|---|---|---|
| Reproduction Ratio | 0.0 | 0.3 | 0.7 |
| f' | 1.00 | 0.96 | 0.72 |
| F No. | 2.40 | 2.77 | 3.19 |

TABLE 6-continued

Example 2

| | Infinity | Intermediate | Proximal |
|---|---|---|---|
| 2ω (°) | 27.0 | 22.6 | 18.8 |
| DD [15] | 0.082 | 0.238 | 0.495 |
| DD [19] | 0.465 | 0.309 | 0.052 |

EXAMPLE 3

Figure 9:
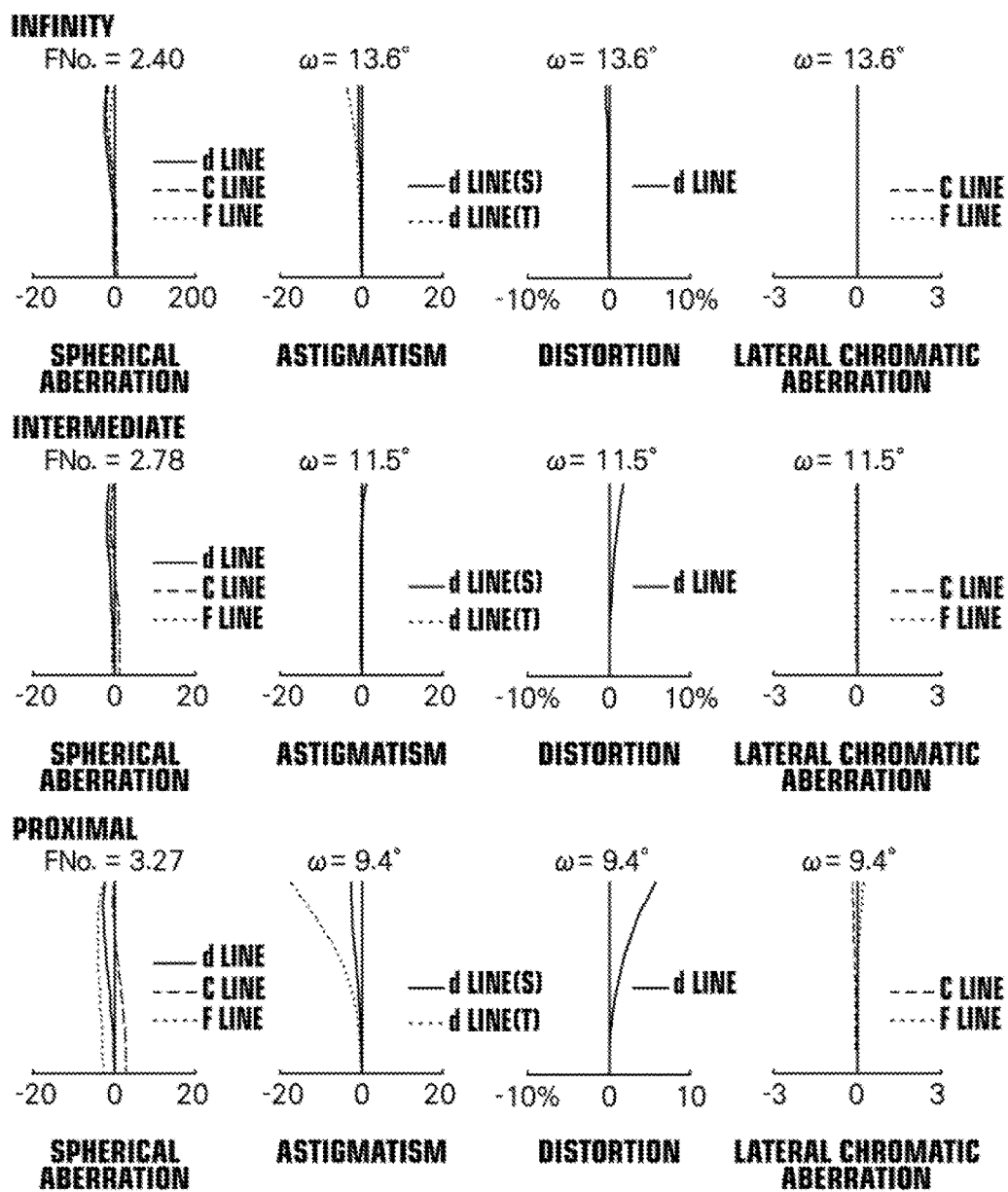
FIG. 9 is a collection of diagrams that illustrate various aberrations of the imaging lens according to Example 3, which are spherical aberration, astigmatism, distortion, and lateral chromatic aberration in this order from the left side of the drawing sheet.

The lens configuration of and the paths of light beams through an imaging lens of Example 3 are illustrated in FIG. 3. In the imaging lens of Example 3, the first lens group G1 is constituted by, in order from the object side to the image side, a first lens group front group G1A and a first lens group rear group G1B. The first lens group front group G1A is constituted by, in order from the object side to the image side, two lenses, which are lenses L11 and L12. The first lens group rear group G1B is constituted by, in order from the object side to the image side, six lenses, which are lenses L13 through L18. The second lens group G2 is constituted by, in order from the object side to the image side, two lenses, which are a lens L21 and a lens L22. The third lens group G3 is constituted by, in order from the object side to the image side, four lenses, which are lenses L31 through L34. Table 7 shows basic lens data of the imaging lens of Example 3. Table 8 shows aspherical surface coefficients of the imaging lens of Example 3. Table 9 shows various items and the values of variable distances among surfaces of the imaging lens of Example 3. Diagrams that illustrate various aberrations of the imaging lens of Example 3 are illustrated in FIG. 9.

TABLE 7

Example 3

| Si | Ri | Di | Ndj | vdj |
|---|---|---|---|---|
| 1 | 0.66437 | 0.167 | 2.00100 | 29.13 |
| 2 | 2.55019 | 0.006 | | |
| 3 | 2.11546 | 0.042 | 1.43875 | 94.94 |
| 4 | 0.28759 | 0.232 | | |
| 5 | −82.15544 | 0.066 | 1.74100 | 52.64 |
| 6 | −0.35545 | 0.033 | 1.89286 | 20.36 |
| 7 | −0.93329 | 0.072 | | |
| 8 | −0.33083 | 0.035 | 1.85478 | 24.80 |
| 9 | 3.14894 | 0.065 | 1.66672 | 48.32 |
| 10 | −0.48834 | 0.025 | | |
| 11 | −1.45113 | 0.050 | 1.95375 | 32.32 |
| 12 | −0.46852 | 0.003 | | |
| 13 | 1.17858 | 0.033 | 1.95375 | 32.32 |
| 14 | 15.91691 | 0.003 | | |
| 15 (St) | ∞ | DD [15] | | |
| 16 | 26.48657 | 0.033 | 1.75500 | 52.32 |
| 17 | 0.44493 | 0.032 | | |
| *18 | −42.62703 | 0.033 | 1.51633 | 64.06 |
| *19 | −9.34225 | DD [19] | | |
| 20 | 2.81287 | 0.062 | 1.95375 | 32.32 |
| 21 | −0.97311 | 0.005 | | |
| 22 | 1.12226 | 0.033 | 1.90366 | 31.31 |
| 23 | 2.63299 | 0.018 | | |
| 24 | −6.61629 | 0.054 | 1.95375 | 32.32 |
| 25 | −0.74700 | 0.033 | 1.80518 | 25.42 |
| 26 | 1.03374 | 0.364 | | |

TABLE 8

Example 3

| Surface Number | 18 | 19 |
|---|---|---|
| KA | 5.1534294E+04 | −2.8565398E+03 |
| A4 | 7.8635298E+00 | 7.8214244E+00 |
| A6 | 1.6321118E+01 | −1.5802662E+01 |
| A8 | −1.4441207E+03 | −3.1108658E+00 |
| A10 | 2.5589291E+04 | 1.0379843E+03 |

TABLE 9

Example 3

| | Infinity | Intermediate | Proximal |
|---|---|---|---|
| Reproduction Ratio | 0.0 | 0.3 | 0.7 |
| f' | 1.00 | 0.98 | 0.73 |
| F No. | 2.40 | 2.78 | 3.27 |
| 2ω (°) | 27.2 | 23.0 | 18.8 |
| DD [15] | 0.082 | 0.224 | 0.481 |
| DD [19] | 0.469 | 0.327 | 0.071 |

EXAMPLE 4

Figure 10:
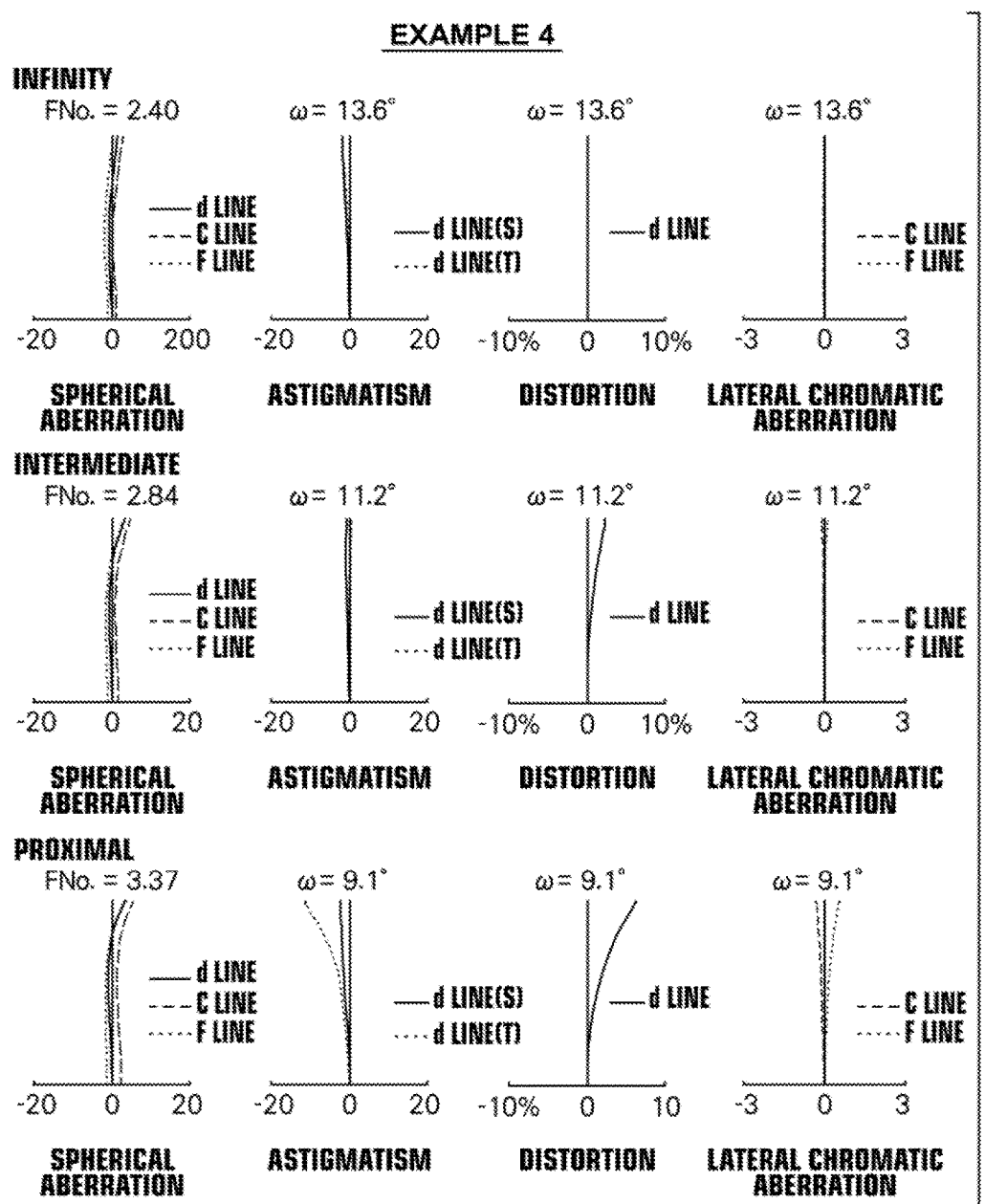
FIG. 10 is a collection of diagrams that illustrate various aberrations of the imaging lens according to Example 4, which are spherical aberration, astigmatism, distortion, and lateral chromatic aberration in this order from the left side of the drawing sheet.

The lens configuration of and the paths of light beams through an imaging lens of Example 4 are illustrated in FIG. 4. In the imaging lens of Example 4, the first lens group G1 is constituted by, in order from the object side to the image side, a first lens group front group G1A and a first lens group rear group G1B. The first lens group front group G1A is constituted by, in order from the object side to the image side, two lenses, which are lenses L11 and L12. The first lens group rear group G1B is constituted by, in order from the object side to the image side, five lenses, which are lenses L13 through L17. The second lens group G2 is constituted by, in order from the object side to the image side, three lenses, which are lenses L21 through L23. The third lens group G3 is constituted by, in order from the object side to the image side, four lenses, which are lenses L31 through L34. Table 10 shows basic lens data of the imaging lens of Example 4. Table 11 shows aspherical surface coefficients of the imaging lens of Example 4. Table 12 shows various items and the values of variable distances among surfaces of the imaging lens of Example 4. Diagrams that illustrate various aberrations of the imaging lens of Example 4 are illustrated in FIG. 10.

TABLE 10

Example 4

| Si | Ri | Di | Ndj | vdj |
|---|---|---|---|---|
| 1 | 0.64147 | 0.105 | 2.00100 | 29.13 |
| 2 | 2.14656 | 0.003 | | |
| 3 | 0.53880 | 0.042 | 1.43875 | 94.94 |
| 4 | 0.26345 | 0.188 | | |
| 5 | −0.45741 | 0.033 | 1.72825 | 28.46 |
| 6 | 1.03499 | 0.003 | | |
| 7 | 1.26223 | 0.075 | 1.74100 | 52.64 |
| 8 | −0.39336 | 0.052 | | |
| 9 | −0.27505 | 0.054 | 1.80809 | 22.76 |
| 10 | 2.55358 | 0.003 | | |
| 11 | 2.93989 | 0.083 | 1.95375 | 32.32 |
| 12 | −0.37976 | 0.003 | | |
| 13 | 1.38205 | 0.033 | 1.91082 | 35.25 |
| 14 | −21.92271 | 0.003 | | |
| 15 (St) | ∞ | DD [15] | | |

TABLE 10-continued

Example 4

| Si | Ri | Di | Ndj | νdj |
|---|---|---|---|---|
| 16 | −2.45448 | 0.033 | 1.89286 | 20.36 |
| 17 | −0.91952 | 0.033 | 1.88100 | 40.14 |
| 18 | 0.77675 | 0.018 | | |
| *19 | −7.55072 | 0.033 | 1.74320 | 49.29 |
| *20 | −2.09387 | DD [20] | | |
| 21 | 12.19384 | 0.062 | 1.43875 | 94.94 |
| 22 | −0.91498 | 0.003 | | |
| 23 | 1.66956 | 0.033 | 1.91082 | 35.25 |
| 24 | 17.44372 | 0.003 | | |
| 25 | 0.76616 | 0.074 | 1.49700 | 81.54 |
| 26 | −18.26309 | 0.003 | | |
| 27 | 0.82191 | 0.033 | 1.57501 | 41.50 |
| 28 | 0.45841 | 0.375 | | |

TABLE 11

Example 4

| Surface Number | 19 | 20 |
|---|---|---|
| KA | −8.1112496E+02 | −5.5866557E+01 |
| A4 | 1.0398805E+01 | 9.4325513E+00 |
| A6 | 7.6793003E+01 | 1.0577538E+02 |
| A8 | −4.9620868E+02 | −9.5967492E+02 |
| A10 | 1.5259945E+04 | 2.5827776E+04 |

TABLE 12

Example 4

| | Infinity | Intermediate | Proximal |
|---|---|---|---|
| Reproduction Ratio | 0.00 | 0.30 | 0.75 |
| f | 1.00 | 1.12 | 0.87 |
| F No. | 2.40 | 2.84 | 3.37 |
| 2ω (°) | 27.2 | 22.4 | 18.2 |
| DD [15] | 0.082 | 0.293 | 0.673 |
| DD [20] | 0.635 | 0.424 | 0.044 |

EXAMPLE 5

Figure 11:
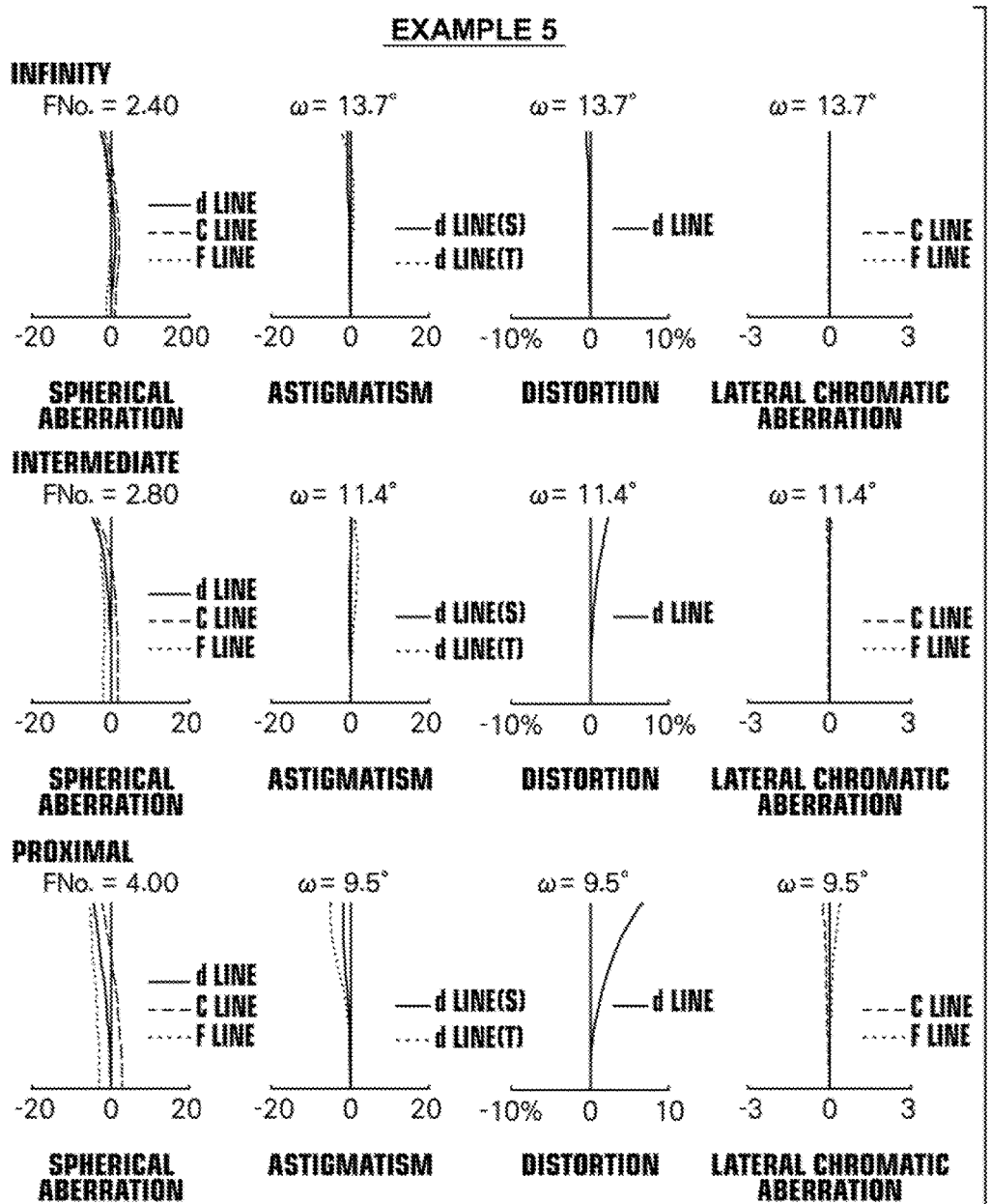
FIG. 11 is a collection of diagrams that illustrate various aberrations of the imaging lens according to Example 5, which are spherical aberration, astigmatism,. distortion, and lateral chromatic aberration in this order from the left side of the drawing sheet.

The lens configuration of and the paths of light beams through an imaging lens of Example 5 are illustrated in FIG. 5. In the imaging lens of Example 5, the first lens group G1 is constituted by, in order from the object side to the image side, a first lens group front group G1A and a first lens group rear group G1B. The first lens group front group G1A is constituted by, in order from the object side to the image side, two lenses, which are lenses L11 and L12. The first lens group rear group G1B is constituted by, in order from the object side to the image side, five lenses, which are lenses L13 through L17. The second lens group G2 is constituted by, in order from the object side to the image side, three lenses, which are lenses L21 through L23. The third lens group G3 is constituted by, in order from the object side to the image side, three lenses, which are lenses L31 through L33. Table 13 shows basic lens data of the imaging lens of Example 5. Table 14 shows aspherical surface coefficients of the imaging lens of Example 5. Table 15 shows various items and the values of variable distances among surfaces of the imaging lens of Example 5. Diagrams that illustrate various aberrations of the imaging lens of Example 5 are illustrated in FIG. 11.

TABLE 13

Example 5

| Si | Ri | Di | Ndj | νdj |
|---|---|---|---|---|
| 1 | 0.66618 | 0.109 | 1.90366 | 31.31 |
| 2 | 2.32521 | 0.003 | | |
| 3 | 0.49859 | 0.042 | 1.43875 | 94.94 |
| 4 | 0.27026 | 0.186 | | |
| 5 | −0.47502 | 0.034 | 1.66680 | 33.05 |
| 6 | 0.79306 | 0.008 | | |
| 7 | 1.08352 | 0.088 | 1.69100 | 54.82 |
| 8 | −0.37047 | 0.040 | | |
| 9 | −0.27869 | 0.034 | 1.80518 | 25.42 |
| 10 | 1.04828 | 0.128 | 1.91082 | 35.25 |
| 11 | −0.39341 | 0.003 | | |
| 12 | 1.26997 | 0.034 | 1.91082 | 35.25 |
| 13 | 13.57534 | 0.003 | | |
| 14 (St) | ∞ | DD [14] | | |
| 15 | −2.24435 | 0.034 | 1.89286 | 20.36 |
| 16 | −0.86537 | 0.034 | 1.88100 | 40.14 |
| 17 | 1.14123 | 0.010 | | |
| *18 | −4.11205 | 0.034 | 1.74320 | 49.29 |
| *19 | −2.76622 | DD [19] | | |
| 20 | −13.72277 | 0.066 | 1.43875 | 94.94 |
| 21 | −0.72467 | 0.003 | | |
| 22 | 0.59499 | 0.083 | 1.48749 | 70.24 |
| 23 | −23.06729 | 0.003 | | |
| 24 | 0.57517 | 0.063 | 1.54072 | 47.23 |
| 25 | 0.36270 | 0.384 | | |

TABLE 14

Example 5

| Surface Number | 18 | 19 |
|---|---|---|
| KA | 2.7945507E+02 | −4.9796900E+02 |
| A4 | 1.4495994E+01 | 1.1336837E+01 |
| A6 | 1.2274345E+02 | 1.9652043E+02 |
| A8 | −2.1097548E+03 | −2.7107758E+03 |
| A10 | 2.3428469E+04 | 2.8670177E+04 |

TABLE 15

Example 5

| | Infinity | Intermediate | Proximal |
|---|---|---|---|
| Reproduction Ratio | 0.00 | 0.30 | 0.67 |
| f | 1.00 | 1.02 | 0.81 |
| F No. | 2.40 | 2.80 | 4.00 |
| 2ω (°) | 27.4 | 22.8 | 19.0 |
| DD [14] | 0.082 | 0.305 | 0.659 |
| DD [19] | 0.604 | 0.381 | 0.027 |

EXAMPLE 6

The lens configuration of and the paths of light beams through an imaging lens of Example 6 are illustrated in FIG. 6. In the imaging lens of Example 6, the first lens group G1 is constituted by, in order from the object side to the image side, a first lens group front group G1A and a first lens group rear group G1B. The first lens group front group G1A is constituted by, in order from the object side to the image side, two lenses, which are lenses L11 and L12. The first lens group rear group G1B is constituted by, in order from the object side to the image side, five lenses, which are lenses L13 through L17. The second lens group G2 is constituted by, in order from the object side to the image side, two lenses, which are a lens L21 and a lens L22. The third lens group G3 is constituted by, in order from the object side to the image side, four lenses, which are lenses L31 through L34. Table 16 shows basic lens data of the imaging lens of Example 6. Table 17 shows aspherical surface coefficients of the imaging lens of Example 6. Table 18 shows various items and the values of variable distances among surfaces of the imaging lens of Example 6. Diagrams that illustrate various aberrations of the imaging lens of Example 6 are illustrated in FIG. 12.

TABLE 16

Example 6

| Si | Ri | Di | Ndj | vdj |
|---|---|---|---|---|
| 1 | 0.61934 | 0.093 | 1.84666 | 23.78 |
| 2 | 1.72334 | 0.005 | | |
| 3 | 0.43604 | 0.041 | 1.48749 | 70.24 |
| 4 | 0.27712 | 0.195 | | |
| 5 | −0.92133 | 0.033 | 1.89286 | 20.36 |
| 6 | 1.01512 | 0.012 | | |
| 7 | 3.06084 | 0.039 | 1.95375 | 32.32 |
| 8 | −0.77461 | 0.111 | | |
| 9 | −0.27896 | 0.045 | 1.69895 | 30.13 |
| 10 | 23.75973 | 0.092 | 1.72916 | 54.68 |
| 11 | −0.35460 | 0.003 | | |
| 12 | 2.50792 | 0.033 | 1.88300 | 40.76 |
| 13 | −1.06703 | 0.003 | | |
| 14 (St) | ∞ | DD [14] | | |
| 15 | −3.27219 | 0.033 | 1.90366 | 31.31 |
| 16 | 0.78760 | 0.013 | | |
| *17 | −11.67494 | 0.033 | 2.10205 | 16.77 |
| *18 | −1.78157 | DD [18] | | |
| 19 | −1.64036 | 0.033 | 1.81600 | 46.62 |

TABLE 17

Example 6

| Surface Number | 17 | 18 |
|---|---|---|
| KA | 2.8326868E+03 | −1.8673334E+02 |
| A4 | 7.0139490E+00 | 2.7914370E+00 |
| A6 | 8.5714585E+01 | 1.7878428E+02 |
| A8 | −4.1131414E+02 | −2.0318768E+03 |
| A10 | 2.2178514E+04 | 4.1310586E+04 |

TABLE 18

Example 6

| | Infinity | Intermediate | Proximal |
|---|---|---|---|
| Reproduction Ratio | 0.00 | 0.30 | 0.62 |
| f' | 1.00 | 1.07 | 0.88 |
| F No. | 2.44 | 2.66 | 3.06 |
| 2ω (°) | 27.0 | 23.8 | 19.6 |
| DD [14] | 0.081 | 0.251 | 0.746 |
| DD [18] | 0.696 | 0.526 | 0.031 |

Table 19 shows values corresponding to Conditional Formulae (1) through (16) for the imaging lenses of Examples 1 through 6. The values shown in Table 19 are those with respect to the d line.

TABLE 19

| | Formula | Example 1 | Example 2 | Example 3 | Example 4 | Example 5 | Example 6 |
|---|---|---|---|---|---|---|---|
| (1) | f1/f | 0.771 | 0.655 | 0.642 | 0.759 | 0.774 | 0.796 |
| (2) | f1B/f1 | 0.987 | 0.796 | 0.829 | 0.954 | 0.947 | 0.938 |
| (3) | Nd1 − Nd2 | 0.56225 | 0.45675 | 0.56225 | 0.56225 | 0.46491 | 0.35917 |
| (4) | vd2 − vd1 | 65.81 | 49.22 | 65.81 | 65.81 | 63.63 | 46.46 |
| (5) | (R1f + R1r)/(R1r − R1f) | 1.774 | 1.652 | 1.705 | 1.852 | 1.803 | 2.122 |
| (6) | (R2f + R2r)/(R2f − R2r) | 2.904 | 1.302 | 1.315 | 2.914 | 3.367 | 4.488 |
| (7) | D4/f | 0.179 | 0.241 | 0.232 | 0.188 | 0.186 | 0.195 |
| (8) | −f2/f | 0.852 | 0.654 | 0.617 | 0.817 | 0.936 | 1.141 |
| (9) | −f1/f2 | 0.905 | 1.001 | 1.041 | 0.929 | 0.827 | 0.698 |
| (10) | NG2n | 1.88100 | 1.75500 | 1.75500 | 1.88100 | 1.88100 | 1.90366 |
| (11) | vG2n | 40.14 | 52.32 | 52.32 | 40.14 | 40.14 | 31.31 |
| (12) | (RG2nf + RG2nr)/(RG2nf − RG2nr) | −0.010 | 1.197 | 1.034 | 0.084 | −0.137 | 0.612 |
| (13) | −f3/f2 | 0.953 | 1.356 | 1.389 | 0.992 | 1.022 | 0.821 |
| (14) | f3/f | 0.812 | 0.887 | 0.857 | 0.811 | 0.956 | 0.937 |
| (15) | f1/f3 | 0.949 | 0.738 | 0.749 | 0.936 | 0.809 | 0.850 |
| (16) | (RG3nf + RG3nr)/(RG3nf − RG3nr) | 8.088 | 0.297 | −0.161 | 3.522 | 4.414 | 6.305 |

TABLE 16-continued

Example 6

| Si | Ri | Di | Ndj | vdj |
|---|---|---|---|---|
| 20 | −0.82667 | 0.003 | | |
| 21 | −115.22976 | 0.033 | 1.80400 | 46.58 |
| 22 | −1.56241 | 0.003 | | |
| 23 | 1.27176 | 0.038 | 1.49700 | 81.54 |
| 24 | 6.57624 | 0.003 | | |
| 25 | 0.56978 | 0.033 | 1.48749 | 70.24 |
| 26 | 0.41379 | 0.366 | | |

As can be understood from the data above, the imaging lenses of Examples 1 through 6 obtain large reproduction ratios with maximum reproduction ratios of 0.6 or greater, have small fluctuations in aberrations caused by focusing operations, and realize favorable optical performance over a wide range of object distances from infinity to a proximal distance.

Figure 13A:
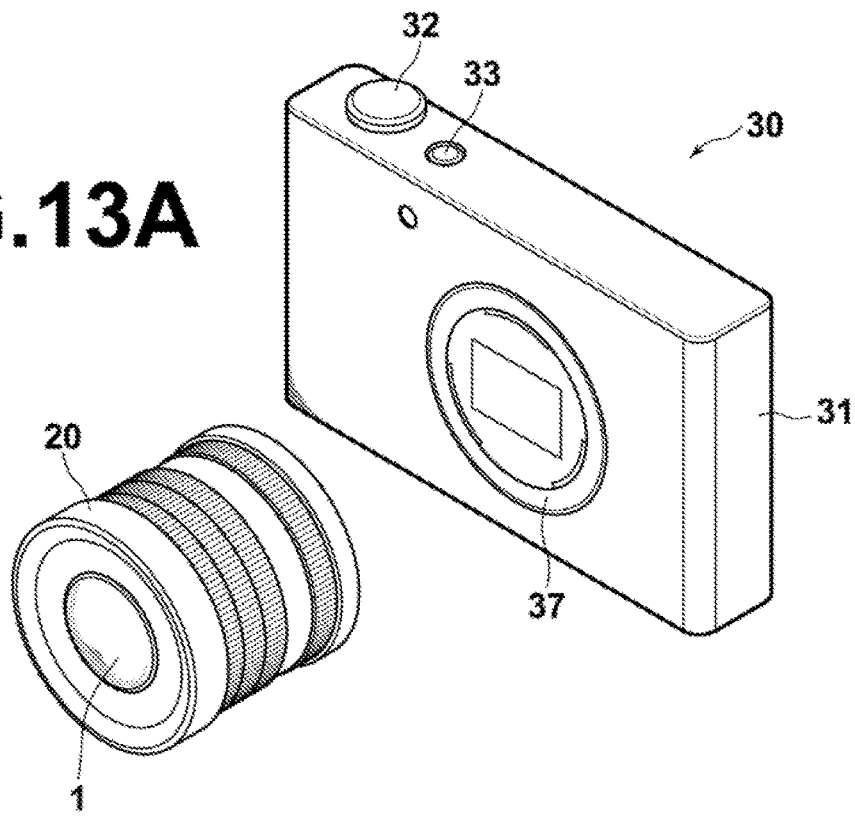
FIG. 13A is a perspective view that illustrates the front side of an imaging apparatus according to an embodiment of the present disclosure.
Figure 13B:
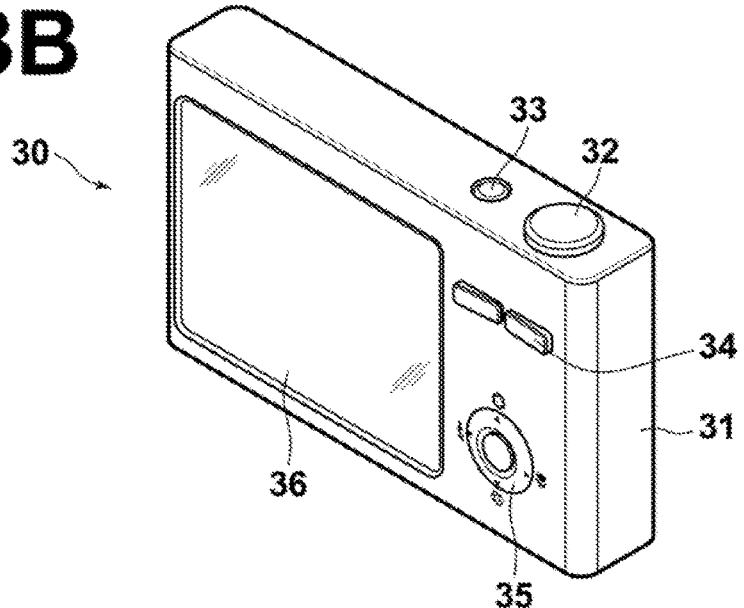
FIG. 13B is a perspective view that illustrates the rear side of an imaging apparatus according to an embodiment of the present disclosure.

Next, an imaging apparatus according to an embodiment of the present disclosure will be described. FIG. 13A and FIG. 13B illustrate the outer appearance of a camera 30, which is an imaging apparatus according to an embodiment of the present disclosure. FIG. 13A illustrates the outer appearance of the camera 30 as viewed from the front, and FIG. 13B illustrates the outer appearance of the camera 30 as viewed from the rear. The camera 30 is a single lens digital camera which does not have a reflex finder, onto which an exchangeable lens 20 is interchangeably mounted. The exchangeable lens 20 is a lens barrel having an imaging lens 1 according to an embodiment of the present disclosure housed therein.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD (Charge Coupled Device) that receives images of subjects formed by the exchangeable lens 20 and outputs image signals corresponding to the images, a signal processing circuit (not shown) that processes the image signals output by the imaging element to generate images, and a recording medium (not shown) for recording the generated images, are provided within the camera body 31. In this camera 30, photography of still images and videos is enabled by pressing the shutter release button 32. Image data obtained by photography or video imaging are recorded in the recording medium.

By applying the imaging lens of the present disclosure as the interchangeable lens 20 for use in such a camera 30, photography at a greater reproduction ratio becomes possible. In addition, images favorable image quality can be obtained at object distances from infinity to a proximal distance.

The present disclosure has been described with reference to the embodiments and Examples thereof. However, the present disclosure is not limited to the embodiments and Examples described above, and various modifications are possible.

For example, the values of the radii of curvature, the distances among surfaces, the refractive indices, the Abbe's numbers, etc. of each lens are not limited to the numerical values indicated in connection with the Examples, and may be other values.

In addition, the embodiment of the imaging apparatus was described with reference to the drawings as a single lens digital camera without a reflex finder. However, the present disclosure is not limited to this application. For example, the imaging lens of the present disclosure may be applied to a single lens reflex camera, a film camera, a video camera, etc.

What is claimed is:

1. An imaging lens, consisting of, in order from the object side to the image side:
    a first lens group having a positive refractive power;
    a stop;
    a second lens group having a negative refractive power; and
    a third lens group having a positive refractive power;
    only the second lens group moving in the direction of the optical axis to perform focusing operations;
    the first lens group consisting of, in order from the object side to the image side, a first lens group front group and a first lens group rear group;
    the first lens group front group consisting of, in order from the object side to the image side, one positive lens and one negative lens;
    the first lens group rear group comprising at least two negative lenses and at least three positive lenses; and
    the second lens group consisting of one or two positive lenses and one negative lens.

2. An imaging lens as defined in claim 1, in which Conditional Formula (1) below is satisfied:

$$0.4 < f1/f < 1 \tag{1}$$

wherein f1 is the focal length of the first lens group, and f is the focal length of the entire lens system in a state focused on an object at infinity.

3. An imaging lens as defined in claim 1, in which Conditional Formula (2) below is satisfied:

$$0.6 < f1B/f1 < 1.2 \tag{2}$$

wherein f1B is the focal length of the first lens group rear group, and f1 is the focal length of the first lens group.

4. An imaging lens as defined in claim 1, in which Conditional Formula (9) below is satisfied:

$$0.5 < -f1/f2 < 1.3 \tag{9}$$

wherein f1 is the focal length of the first lens group, and f2 is the focal length of the second lens group.

5. An imaging lens as defined in claim 1, in which Conditional Formula (13) below is satisfied:

$$0.6 < -f3/f2 < 1.7 \tag{13}$$

wherein f3 is the focal length of the third lens group, and f2 is the focal length of the second lens group.

6. An imaging lens as defined in claim 1, in which Conditional Formula (3) below is satisfied:

$$0.2 < Nd1 - Nd2 < 0.7 \tag{3}$$

wherein Nd1 is the refractive index with respect to the d line of the positive lens within the first lens group front group, and Nd2 is the refractive index with respect to the d line of the negative lens within the first lens group front group.

7. An imaging lens as defined in claim 1, in which Conditional Formula (4) below is satisfied:

$$35 < vd2 - vd1 < 75 \tag{4}$$

wherein vd2 is the Abbe's number with respect to the d line of the negative lens within the first lens group front group, and vd1 is the Abbe's number with respect to the d line of the positive lens within the first lens group front group.

8. An imaging lens as defined in claim 1, in which Conditional Formula (5) below is satisfied:

$$1 < (R1f + R1r)/(R1r - R1f) < 2.5 \tag{5}$$

wherein R1f is the radius of curvature of the surface toward the object side of the positive lens within the first lens group front group, and R1r is the radius of curvature of the surface toward the image side of the positive lens within the first lens group front group.

9. An imaging lens as defined in claim 1, in which Conditional Formula (6) below is satisfied:

$$0.8 < (R2f + R2r)/(R2f - R2r) < 5.5 \tag{6}$$

wherein R2f is the radius of curvature of the surface toward the object side of the negative lens within the first lens group front group, and R2r is the radius of curvature of the surface toward the image side of the negative lens within the first lens group front group.

10. An imaging lens as defined in claim 1, wherein:
the first and second lenses from the object side within the first lens group rear group have refractive powers of signs opposite each other; and
the third and fourth lenses from the object side within the first lens group rear group have refractive powers of signs opposite each other.

11. An imaging lens as defined in claim 1, wherein:
the first lens group consists of 8 or fewer lenses.

12. An imaging lens as defined in claim 2, in which Conditional Formula (1-1) below is satisfied:

$$0.5 < f1/f < 0.9 \quad (1\text{-}1).$$

13. An imaging lens as defined in claim 3, in which Conditional Formula (2-1) below is satisfied:

$$0.7 < f1B/f1 < 1.1 \quad (2\text{-}1).$$

14. An imaging lens as defined in claim 4, in which Conditional Formula (9-1) below is satisfied:

$$0.6 < -f1/f2 < 1.2 \quad (9\text{-}1).$$

15. An imaging lens as defined in claim 5, in which Conditional Formula (13-1) below is satisfied:

$$0.7 < -f3/f2 < 1.6 \quad (13\text{-}1).$$

16. An imaging lens as defined in claim 6, in which Conditional Formula (3-1) below is satisfied:

$$0.3 < Nd1 - Nd2 < 0.6 \quad (3\text{-}1).$$

17. An imaging lens as defined in claim 7, in which Conditional Formula (4-1) below is satisfied:

$$40 < vd2 - vd1 < 70 \quad (4\text{-}1).$$

18. An imaging lens as defined in claim 8, in which Conditional Formula (5-1) below is satisfied:

$$1.5 < (R1f + R1r)/(R1r - R1f) < 2.2 \quad (5\text{-}1).$$

19. An imaging lens as defined in claim 9, in which Conditional Formula (6-1) below is satisfied:

$$1 < (R2f + R2r)/(R2f - R2r) < 5 \quad (6\text{-}1).$$

20. An imaging apparatus equipped with an imaging lens as defined in claim 1.

* * * * *